US012168347B2

(12) United States Patent
Arakane et al.

(10) Patent No.: US 12,168,347 B2
(45) Date of Patent: Dec. 17, 2024

(54) CONTROL SYSTEM

(71) Applicant: BROTHER KOGYO KABUSHIKI KAISHA, Nagoya (JP)

(72) Inventors: Satoru Arakane, Nagoya (JP); Masahiro Hoga, Ogaki (JP); Shohei Ichikawa, Niwa (JP); Eisuke Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/705,490

(22) Filed: Mar. 28, 2022

(65) Prior Publication Data

US 2022/0314666 A1 Oct. 6, 2022

(30) Foreign Application Priority Data

Mar. 30, 2021 (JP) ................................ 2021-058135

(51) Int. Cl.
*B41J 19/20* (2006.01)
*B41J 2/01* (2006.01)

(52) U.S. Cl.
CPC ............... *B41J 19/202* (2013.01); *B41J 2/01* (2013.01)

(58) Field of Classification Search
None
See application file for complete search history.

(56) References Cited

U.S. PATENT DOCUMENTS

| | | | | |
|---|---|---|---|---|
| 5,116,149 A * | 5/1992 | Yamasaki | B41J 11/42 400/279 |
| 2010/0007689 A1* | 1/2010 | Hagiwara | B41J 29/38 347/19 |
| 2018/0272769 A1* | 9/2018 | Arakane | B41J 11/008 |
| 2020/0001598 A1* | 1/2020 | Arakane | B41J 11/006 |
| 2021/0402813 A1* | 12/2021 | Murase | B41J 2/195 |

FOREIGN PATENT DOCUMENTS

| | | |
|---|---|---|
| JP | 2005-022115 A | 1/2005 |
| JP | 2019-072910 A | 5/2019 |

* cited by examiner

*Primary Examiner* — Alejandro Valencia
(74) *Attorney, Agent, or Firm* — Scully, Scott, Murphy & Presser, P.C.

(57) ABSTRACT

In a control system, a controller is configured to determine presence or absence of an obstructed area within the intermediate section, and control movement of the moving body in accordance with a selected one of controlling methods including a first and a second control methods. The first control method causes the moving body to move at a first constant speed in the processing section defined within the intermediate section and at a second constant speed faster than the first constant speed in at least a part of a non-processing section within the intermediate section and other than the processing section, the first control method being selected when the obstructed area is absent. The second control method causes the moving body to move at the first constant speed in the processing section and the non-processing section, the second control method being selected when the obstructed area is present.

10 Claims, 15 Drawing Sheets

FIG. 3A
FIG. 3B
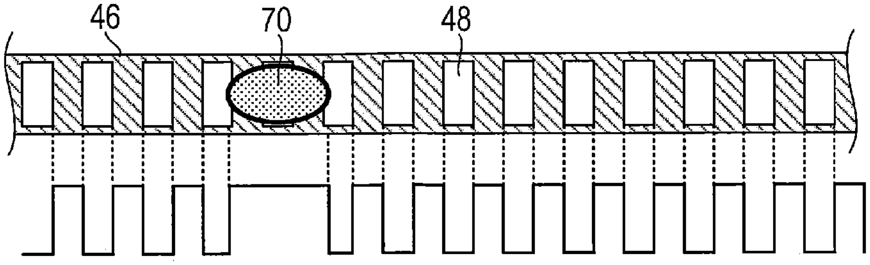
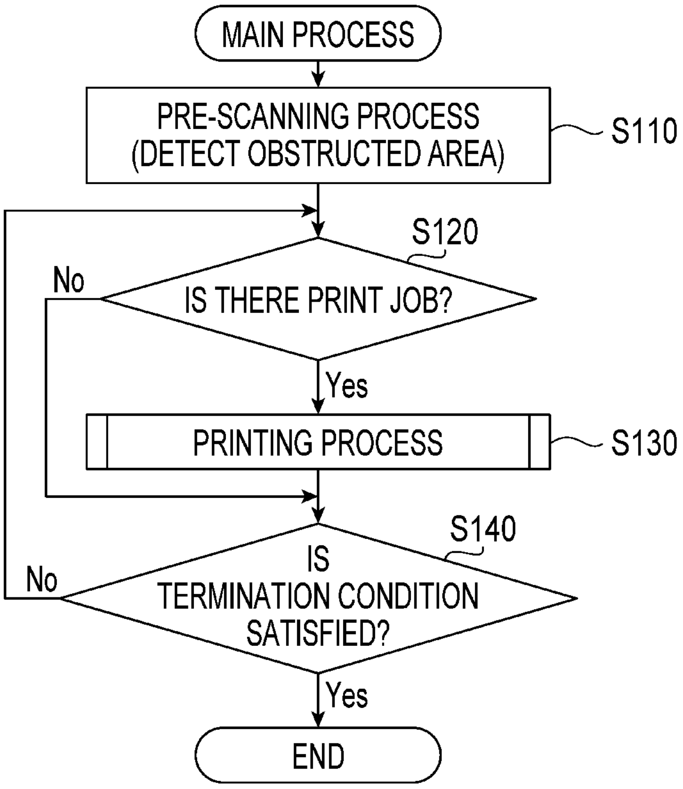
FIG. 4

CONTROL SYSTEM

CROSS-REFERENCE TO RELATED APPLICATIONS

This application claims priority under 35 U.S.C. § 119 from Japanese Patent Application No. 2021-058135 filed on Mar. 30, 2021. The entire subject matter of the application is incorporated herein by reference.

BACKGROUND

The present disclosures relate to a control system.

There has been known a technique, for example, in the field of inkjet printers, to increase a processing speed by increasing a moving speed of a carriage mounting an inkjet head in a non-image area sandwiched between image areas.

SUMMARY

A system for processing a target object by moving a carriage mounting a processing head is typically configured to measure a position and a speed of the carriage by reading an encoder scale with a sensor that moves, together with the carriage, relative to the encoder scale. The measured position and speed of the carriage are used for a movement control of the carriage.

In the system employing the encoder scale and sensor to measure the position and speed, if a portion of the encoder scale is covered with obstacles that impede the sensor from reading the encoder scale, at least when the carriage and the sensor pass the portion where the encoder scale is covered with the obstacles, the measurement cannot be performed normally.

When the carriage is accelerated or decelerated in a high-speed range, even a short period of impediment of reading of the encoder scale could obstacle an accurate detection of a moving status of the carriage, and an appropriate movement control of the carriage.

According to aspects of the present disclosures, there is provided a control system provided with a motor, a moving body configured to be driven by the motor to move along a passage and to process an object, an encoder including an encoder scale and a sensor configured to move relative to the encoder scale in association with the moving body to output an encoder signal by reading the encoder scale, a measuring instrument configured to measure a status amount representing a moving status of the moving body along the passage based on the encoder signal, and a controller configured to control the movement of the moving body by controlling the motor based on the status amount measured by the measuring instrument. A moving path of the moving body from a movement start position to a stop position includes an acceleration section, in which the moving body located at the movement start position is accelerated to a constant speed moving state, a deceleration section, in which the moving body at the constant speed moving state is decelerated and stopped at the stop point, and an intermediate section, which is defined between the acceleration section and the deceleration section, the intermediate section including a processing section, the moving body processing the object when moving in the processing section. The controller is configured to perform determining presence or absence, within the intermediate section, of an obstructed area which is a portion of the encoder scale to which an obstacle preventing the sensor from normally reading the encoder scale is adhered, selecting, based on absence or presence of the obstructed area, one of a plurality of controlling methods including a first control method and a second control method, and controlling movement of the moving body within the moving path in accordance with the selected control method. The first control method causes the moving body to move at a constant speed at a first speed in the processing section defined within the intermediate section and cause the moving body to move at a constant speed at a second speed that is faster than the first speed in at least a part of a non-processing section that is a section within the intermediate section and other than the processing section, the first control method being selected when it is determined that the obstructed area is absent. The second control method causes the moving body to move at the constant speed at the first speed in the processing section and the non-processing section, the second control method being selected when it is determined that the obstructed area is present.

According to aspects of the present disclosures, there is provided a control system provided with a motor, a moving body configured to be driven by the motor to move along a passage and to process an object, an encoder including an encoder scale and a sensor configured to move relative to the encoder scale in association with the moving body to output an encoder signal by reading the encoder scale, a measuring instrument configured to measure a status amount representing a moving status of the moving body along the passage based on the encoder signal, and a controller configured to control movement of the moving body by controlling the motor based on the status amount measured by the measuring instrument. A moving path of the moving body from a movement start position to a stop position includes an acceleration section in which the moving body located at the movement start position is accelerated to a constant speed moving state, a deceleration section in which the moving body in the constant speed moving state is decelerated and stopped at the stop position, and an intermediate section between the acceleration section and the deceleration section, the intermediate section including a processing section, the moving body processing the object when moving in the processing section. The controller is configured to perform determining presence or absence, within a non-processing section that is a section other than the processing section in the intermediate section, of an obstructed area which is a part of a moving area of the moving body corresponding to a portion of the encoder scale to which an obstacle preventing the sensor from normally reading the encoder scale and to be read by the sensor, selecting, based on absence or presence of the obstructed area, one of a plurality of controlling methods including a first control method and a second control method, and controlling movement of the moving body within the moving path in accordance with the selected control method. The first control method causes the moving body to move at a constant speed at a first speed in the processing section defined within the intermediate section and cause the moving body to move at a constant speed at a second speed that is faster than the first speed in at least a part of the non-processing section within the intermediate section, the first control method being selected when it is determined that the obstructed area is absent. The second control method causes the moving body to move at a constant speed at the first speed in an adjacent section, which is a section, within the intermediate section, adjacent to the processing section and the non-processing section and between an end point of the processing section including the obstructed area and an end point of the obstructed area, and causes the moving body at a constant speed at the second speed in at least a part of the non-processing section excluding the adjacent section, the second control method being selected when it is determined that the obstructed area is present.

According to this control system, when there is an obstructed area in the intermediate section, the moving body is not controlled to move at a high speed in the section including the obstructed area. Therefore, this control system allows the moving body to move at high speed while suppressing the influence on the movement control of the moving body due to the obstruction of normal measurement by the measuring instrument caused by the presence of the obstructed area.

BRIEF DESCRIPTION OF THE DRAWINGS

FIG. 3A illustrates a dirt adhered onto a linear scale.

FIG. 3B illustrates an example of an encoder signal when the linear scale shown in FIG. 3A is read by an optical sensor.

FIG. 4 is a flowchart illustrating a main process performed by a processor of the image forming system.

DETAILED DESCRIPTION OF THE EMBODIMENTS

Figure 1:
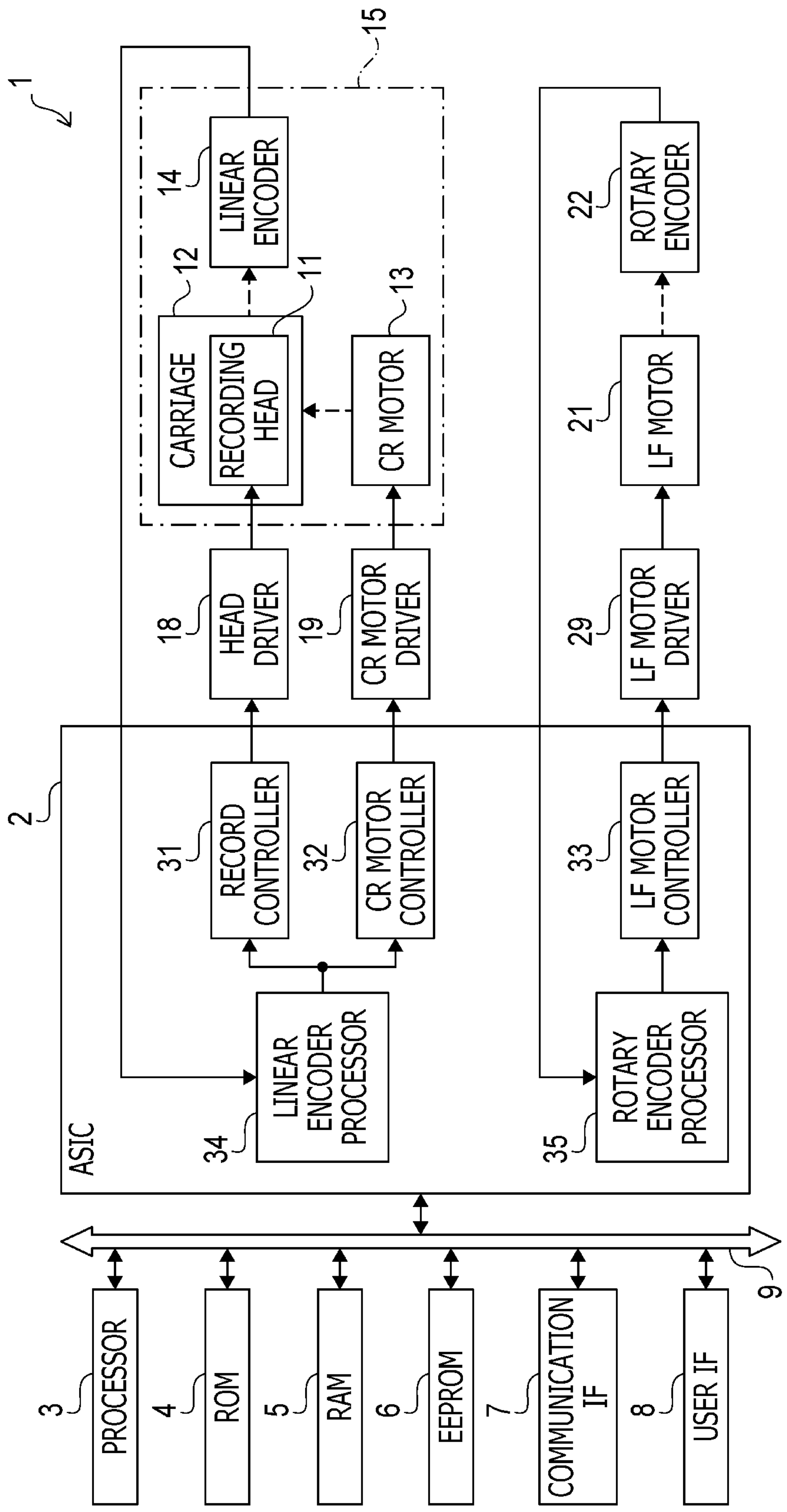
FIG. 1 is a block diagram showing a configuration of an image forming system.
Figures 2A, 2B:
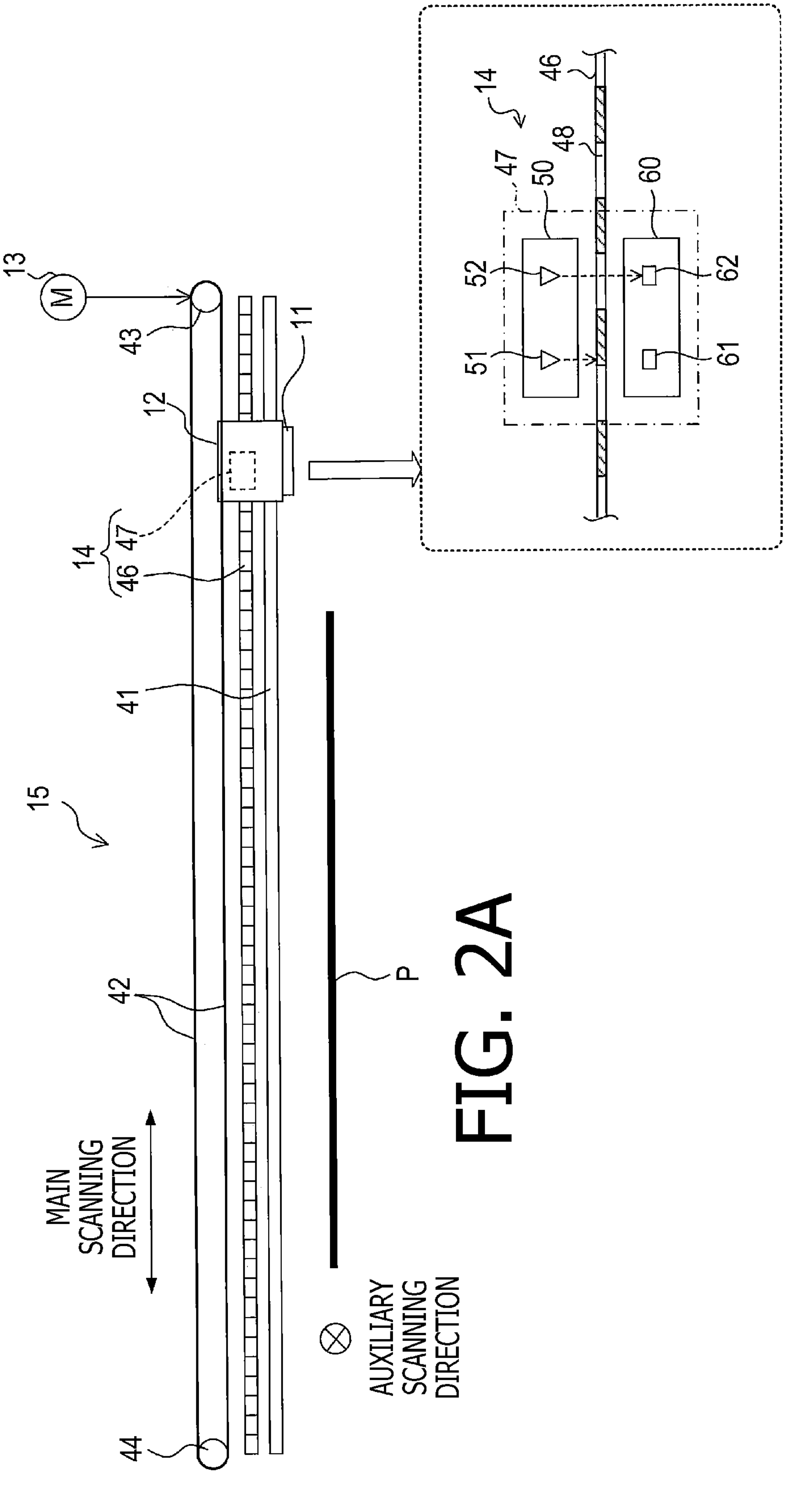
FIG. 2A schematically shows a configuration of a print mechanism and a linear encoder.
FIG. 2B schematically shows an enlarged view of an optical sensor.

Hereinafter, referring to the accompanying drawings, an embodiment according to aspects of the present disclosures will be described. An image forming system 1 shown in FIG. 1 is configured as an inkjet printer. The image forming system 1 includes a recording head 11, a carriage 12, a carriage motor (hereinafter, referred to as a "CR motor") 13 and a linear encoder 14. It is noted that the recording head 11, the carriage 12, the CR motor 13 and the linear encoder 14 constitute a part of a print mechanism 15, detailed of which is shown in FIG. 2A.

The print mechanism 15 is configured to move the carriage 12, which mounts the recording head 11, in a main scanning direction by a driving force received from the CR motor 13. The main scanning direction is a direction orthogonal to an auxiliary scanning direction in which a sheet P is conveyed. The main scanning direction and the auxiliary scanning direction are indicated in FIG. 2A.

The recording head is a so-called inkjet head which is an ejection head configured to eject ink droplets. That is, the recording head 11 is configured to perform an ejection operation to eject the ink droplets as the carriage 12 is moved in the main scanning direction, to transverse above the sheet P to form an image on the sheet P. According to the present embodiment, the CR motor 13 is a DC motor and serves as a driving source for driving the carriage 12 to reciprocally move in the main scanning direction.

The linear encoder 14 is an incremental type optical linear encoder and is used to measure a position and a speed of the carriage 12 along the main scanning direction. The position and the speed of the carriage 12 correspond to status amounts, or motion parameters indicating the moving status of the carriage 12.

The image forming system 1 is equipped with a line feed motor (hereinafter, referred to as an "LF motor") 21, and a rotary encoder to realize conveyance of the sheet p (see FIG. 1). That is, the LF motor 21 is a DC motor and serves as a driving source for driving a conveying roller (not shown) to rotate to convey the sheet P in the auxiliary scanning direction. The rotary encoder 22 is an incremental type optical rotary encoder and is used to measure a rotation amount and a rotation speed of the conveying roller.

The image forming system 1 further includes a head driver 18, a CR motor driver 19, an LF motor driver 29, and an ASIC 2 for driving and controlling the recording head 11, the CR motor 13, and the LF motor 21. The head driver 18 is configured to drive the recording head so that the recording head 11 ejects the ink droplets in accordance with a control signal input from the ASIC 2.

The CR motor driver 19 is configured to rotationally drive the CR motor 13 in accordance with a control signal input from the ASIC 2. The LF motor driver 29 is configured to rotationally drive the LF motor 21 in accordance with a control signal input from the ASIC 2.

The ASIC 2 is configured to control the ejection operation of the recording head 11 to eject the ink droplets, the movement operation of the carriage 12 by the CR motor 13, and the sheet conveying operation of the LF motor to convey the sheet P by inputting the control signals to the drivers 18, 19 and 29. The ASIC 2 includes a recording controller 31, a CR motor controller 32, an LF motor controller 33, a linear encoder processor 34, and a rotary encoder processor 35.

A concrete configuration of the image forming system 1 will be described with reference to FIGS. 1 and 2A. The print mechanism 15 has a guiding shaft 41 extending in the main scanning direction and defining a passage of the carriage 12. The guiding shaft 41 is inserted in the carriage (i.e., the carriage 12 is slidably fitted onto the guiding shaft 41).

The carriage 12 is further secured to an endless belt 42 which is provided to extend along the guiding shaft 41. The endless belt 42 is wound around a driving pulley 43 arranged at one end of the guiding shaft 41 and a driven pulley 44 arranged at the other end of the guiding shaft 41.

The driving pulley 43 is configured to be driven by the CR motor 13 and rotate the endless belt 42. As a driving force of the CR motor 13 is transmitted to the endless belt 42 via the driving pulley 43, the carriage 12 moves in the main scanning direction along the guiding shaft 41.

In the vicinity of the guiding shaft 41, a linear scale 46 is arranged over an entire length of the guiding shaft 41 as an encoder scale. Further, on the carriage 12, an optical sensor 47 including a light emitter 50 and a light receiver 60 is mounted.

The linear encoder 14 is configured by the optical sensor 47 and the linear scale 46. A configuration of the optical sensor 47 is shown in FIG. 2B. The linear scale 46 is an elongated thin plate member extending in the main scanning direction and has a plurality of slits 48 formed on the plate member at every particular interval and arranged along a longitudinal direction (i.e., the main scanning direction) of the plate member. Each slit 48 may have a rectangular shape or a hole having a round shape, and may be covered with a transparent member. The light emitter 50 and the light receiver 60 constituting the optical sensor 47 may be arranged to sandwich the linear scale 46 as shown in FIG. 2B.

The light emitter 50 contains two light-emitting elements 51 and 52. Specifically, the light emitter 50 contains an A-phase light-emitting element 51 and a B-phase light-emitting element 52. The light receiver 60 contains two light-receiving elements 61 and 62 corresponding to the two light-emitting elements 51 and 52, respectively. Specifically, the light receiver 60 contains an A-phase light-receiving element 61 configured to receive light emitted by the A-phase light-emitting element 51, and a B-phase light-receiving element 62 configured to receive light emitted by the B-phase light-emitting element 52.

The optical sensor 47 is fixedly secured to the carriage 12 and moves along the linear scale 46 in the main scanning direction in association with the carriage 12. That is, the optical sensor 47 moves, in the main scanning direction, relative to the linear scale 46.

As a positional relationship between the optical sensor 47 and the linear scale 46 changes, light receiving states of the light-receiving elements 61 and 62 change. The optical sensor 47 is configured to output two types of pulse signals corresponding to the change of the light receiving states of the light-receiving elements 61 and 62 as an encoder signal. Hereinafter, the light-receiving elements 61 and 62 will also be referred to as A-phase light-receiving element 61 and B-phase light-receiving elements 62, respectively.

That is, the optical sensor 47 outputs two types of pulse signals having a particular phase difference (which is 90 degrees in the present embodiment) according to the movement of the carriage 12. The first pulse signal is an A-phase signal corresponding to the light receiving state of the A-phase light-receiving element 61, and the second pulse signal is a B-phase signal corresponding to the light receiving state of the B-phase light-receiving element 62.

The linear encoder processor 34 determines a moving direction, a location, and a moving speed of the carriage 12 based on the A-phase signal and B-phase signal input from the linear encoder 14 as the encoder signals. The linear encoder processor 34, together with the linear encoder 14, functions as a measuring instrument to measure the position and speed of the carriage 12. Measurement results of the position and speed of the carriage 12 are input to the recording controller 31 and the CR motor controller 32.

It is noted that the measurement of the position and speed of the carriage 12 is performed based on at least one of the A-phase signal and the B-phase signal. In the following description, in order to simplify an explanation, a case where the position and the speed of the carriage are measured based on the A-phase signal will be described.

According to the present example, the linear encoder processor 34 detects a rising edge and a falling edge of the A-phase signal input from the linear encoder 14. At every detection of the rising and falling edges of the A-phase signal, the linear encoder processor 34 updates a count value of a position counter (not shown). The count value corresponds to the measured value of the location of the carriage 12.

Synchronously with the detection timing of each edge of the A-phase signal, the linear encoder processor 34 measures the speed of the carriage based on an edge interval, which is a time period between a previous detection of the edge to a current detection of the edge. It is noted that the speed is proportional to an inverse of the edge interval.

The recording controller 31 generates a control signal for controlling the recording head 11 based on the measured values input from the linear encoder processor 34, and inputs the generated control signal to a head driver 18. The head driver 18 drives the recording head 11 based on the control signal input from the recording controller 31 to cause the recording head 11 to eject ink droplets in accordance with the position of the carriage 12.

The CR motor controller 32 calculates an operation amount U for the CR motor 13 at every particular control period based on the measured values input from the linear encoder processor 34. The operation amount U could be an operation amount designating an electrical power to be applied to the CR motor 13, in particular, an electrical voltage instructing value which instructs the voltage to be applied to the CR motor 13. It is noted, however, the operation amount U may be an electrical current instructing value instructing an electrical current to be applied to the CR motor 13, or a PWM value.

The CR motor controller 32 inputs, to the CR motor driver 19, a PWM signal for applying the electrical power corresponding to the calculated operation amount U to the CR motor 13 as the control signal for the CR motor 13.

Then, the CR motor driver 19 drives the CR motor 13 in accordance with the control signal input from the CR motor controller 32. As driven by the CR motor 13, the carriage 12 and the recording head 11 move in the main scanning direction.

The rotary encoder 22 is configured to output two types of pulse signals having a particular phase difference (which is 90 degrees in the present embodiment) according to rotation of the LF motor 21 as encoder signals. The encoder signals are input to the rotary encoder processor 35 of the ASIC 2.

The rotary encoder processor 35 measures a rotation amount and a rotation speed of the conveying roller configured to convey the sheet P based on the encoder signals input from the rotary encoder 22.

The LF motor controller 33 calculates, at every particular control period, an operation amount of the LF motor 21 based on the measured values input from the rotary encoder processor 35 to control the rotation of the conveying roller. Then, the LF motor controller 33 inputs the PWM signal to the LF motor driver 29 to apply the electrical power corresponding to the calculated operation amount to the LF motor 21.

The LF motor driver 29 drives the LF motor 21 in accordance with the control signal input from the LF motor controller 33. Driven by the LF motor 21, the conveying roller rotates, and the sheet P is conveyed in the auxiliary direction.

The image forming system 1 further includes a processor 3, a ROM 4, a RAM 5, an EEPROM 6, a communication interface (hereinafter, referred to as a "communication IF") 7 and a user interface (hereinafter, referred to as a "user IF") 8, which are connected to the ASIC 2 via a bus 9.

The processor 3 is configured to integrally control respective components of the image forming system 1. In the ROM 4, computer programs to be executed by the processor 3 are stored. The RAM 5 is used as a work area when the computer programs are executed by the processor 3. The EEPROM 6 is an electrically erasable and rewritable non-volatile memory and information to be retained after the image forming system 1 is powered off is stored in the EEPROM 6.

The communication IF 7 is configured to communicate with an external device such as a personal computer. The user IF 8 is provided with an operation panel to be operated by the user and a display configured to display various information for the user.

Configured as above, there is a possibility that dirt 70 may be adhered to the linear scale 46 of the linear encoder 14, and the position and speed of the carriage 12 may not be measured properly.

In an example shown in FIG. 3A, the dirt 70 is adhered onto a portion of the linear scale 46. In this example, one of the slits 48 arranged at the portion where the dirt 70 is adhered is covered with the dirt 70. In such a state, the light emitted from the light-emitting elements 51 and 52 does not reach, through the slit 48 covered with the dirt 70, the light-receiving elements 61 and 62, respectively.

As explained above, the dirt 70 may become an obstacle to the reading of the slits 48 of the linear scale 46 when the optical sensor 47 reads the slits 48 by emitting and receiving light. Such a dirt 70 may be generated as grease, ink or paper dust is adhered onto the linear scale 46.

FIG. 3B shows an example of the encoder signal output by the optical sensor 47 when the linear scale 46 shown in FIG. 3A is read by the optical sensor 47. Assuming that the carriage 12 is moving at a constant speed, the encoder signal shown in FIG. 3B may be regarded as the A-phase signal, or the B-phase signal. According to the example shown in FIG. 3B, the edge interval of the encoder signal, which should be a fixed value if there is no dirt 70, is elongated by three times at the portion where the optical sensor 47 passes over the dirt 70.

As described above, according to the present embodiment, the speed of the carriage 12 is measured based on the edge interval. Therefore, the variation of the edge interval due to the dirt 70 causes a discontinuous error in the measured value of the speed of the carriage 12. Such an error in the measured speed causes deterioration of control accuracy when a feedback control of the carriage 12 is performed. When the control accuracy is deteriorated, the quality of the image formed on the sheet P may also be deteriorated.

When an image is formed on the sheet P by ejecting the ink droplets from the recording head 11 with moving the carriage 12 in the main scanning direction, the ink droplets move inertially in the main scanning direction before the ink droplets reach the sheet P. Therefore, an unstable speed of the carriage 12 leads to misalignment of the landing points of the ink droplets, which misalignment deteriorates the quality of the image formed on the sheet P.

The deterioration in the control accuracy may also result in an error in the actual stopping position of the carriage 12 with respect to a target stop position. Such an error will be referred to as a stopping error. The stopping error could affect a speed trajectory of the carriage 12 as it moves from a returning position to the next returning position in its reciprocating motion, and could cause deterioration of the quality of the image formed on the sheet P. In addition, an unstable control resulting from the measurement errors could lead to increase motor noises and impacts of the carriage 12.

Therefore, according to the present embodiment, the presence or absence of a portion when the dirt 70 is adhered, and the portion where the dirt 70 is adhered are estimated, and the control method of the carriage 12 is switched according to the presence or absence of the portion where the dirt 70 is adhered and the portion of the adhesion of the dirt 70. It is noted that the portion where the dirt 70 is adhered is, as described above, the portion at which reading of the slit 48 and the proper measurement are obstructed. In this regard, a moving range of the carriage 12 in which the optical sensor 47 reads a portion where the dirt 70 is adhered will be referred to as an obstructed area.

The obstructed area is a movable range of the optical sensor 47 relative to the linear scale 46, and is also an area that corresponds to a movable range of the optical sensor 47 that reads the portion of the linear scale 46 where the dirt 70, which serves as the obstacle that obstructs the proper reading of the slits 48, is adhered.

In the present embodiment, the optical sensor 47 is configured to read the linear scale 46 in the direction perpendicular to a plane of the linear scale 46. Therefore, the obstructed area corresponds to a moving range of the carriage 12 when the optical sensor 47 is located to face the area where the dirt 70 is adhered to the linear scale 46.

When the image forming system 1 is invoked as the image forming system 1 is powered on or a sleep mode of the image forming system 1 is released, the processor 3 starts executing a main process shown in FIG. 4. When starting the main process, the processor 3 performs a pre-scanning process to estimate the obstructed area (S110).

In the pre-scanning process, the processor 3 instructs the ASIC 2 to move forward the carriage 12 from one end to the other end of the movable range of the carriage 12. In accordance with the above instruction, the CR motor controller 32 performs a drive control of the CR motor 13 to move forward the carriage 12 from one end to the other end of the movable range of the carriage 12.

In the pre-scanning process, the CR motor 13 is controlled such that the carriage 12 moves at a constant speed except for the necessary acceleration and deceleration. This control of the CR motor 13 is performed based on the deviation E=Vr−V, which is a difference between the target speed Vr and the measured speed V. The measured speed V is a measured value of the speed of the carriage 12 obtained from the linear encoder processor 34. A speed anomaly of the carriage 12 is detected on the condition that the deviation E exceeds a threshold value in the section where the carriage 12 is moving at a constant speed. In the pre-scanning process, the obstructed area of the linear scale 46 is estimated based on the speed anomaly.

An example of an estimation method of the obstructed area has been disclosed by the applicant. For example, the position of the obstructed area is estimated based on the count value of the position counter, which is the measured position value X of the carriage 12 output by the linear encoder processor 34 when the speed anomaly of the carriage 12 is detected.

For example, the processor 3 detects a first count value of the position counter from the start of the movement until detection of the speed anomaly when the carriage 12 is moved from one end point to a second end point within the movable range of the carriage 12.

The processor 3 further detects a second count value of the position counter from the start of the movement until the detection of the speed anomaly when the carriage is moved from the second end point to the first end point within the movable range thereof. The obstructed area is estimated to be an area in the main scanning direction between a position on the linear scale 46 corresponding to the first count value when the speed anomaly is detected and another position on the linear scale 46 corresponding to the second count value when the speed anomaly is detected.

According to another example, the obstructed area may be estimated not in terms of the unit of the count of the position counter, but in terms of the unit of a section when the linear scale 46 is divided into multiple sections from an end to the other end. In such a case, one or more sections including an area, in the main scanning direction, between the first count value and the second count value may be estimated as the obstructed area.

According to a further example, a width, in the main scanning direction, of the obstructed area may be estimated based on a time period when the speed anomaly is detected until the speed anomaly is no longer detected, and the target speed Vr. A start point and an end point of the obstructed area may be estimated based on the count value of the position counter at a position where the speed anomaly starts to be detected and the width described above. That is, the end point of the obstructed area may be estimated at a point that is farther away from the start point, in the main scanning direction, by a distance corresponding to the above width.

In addition, whether or not the speed anomaly is caused by the adhesion of dirt 70 may be determined by whether or not the count value of the position counter when the carriage 12 is moved from one end to the other end is different from a design value. The information of the obstructed area estimated by the pre-scanning process is recorded in a register (not shown) of the ASIC 2 and shared by the CR motor controller 32 and the linear encoder processor 34.

The information of the obstructed area as recorded may include the start point and the end point of the obstructed area when the carriage 12 moves in the forward direction, and the start point and the end point of the obstructed area when the carriage 12 moves in a reverse direction. In the register, the start point of the obstructed area and the width of the obstructed area may be recorded as the information regarding the obstructed area. The width of the obstructed area corresponds changing amount of the position counter with respect to the position from which the carriage 12 enters the obstructed area.

The estimation of the obstructed area may be performed by the linear encoder processor 34 in the ASIC 2, or by the processor 3 based on the first count value and the second count value obtained from the ASIC 2.

After completing the pre-scanning process (S110), the processor 3 determines whether there are unprocessed print jobs (S120). Print jobs are received from external devices through the communication IF 7. When there are no unprocessed print jobs (S120: NO), the processor 3 executes a process of S140.

Figure 5:
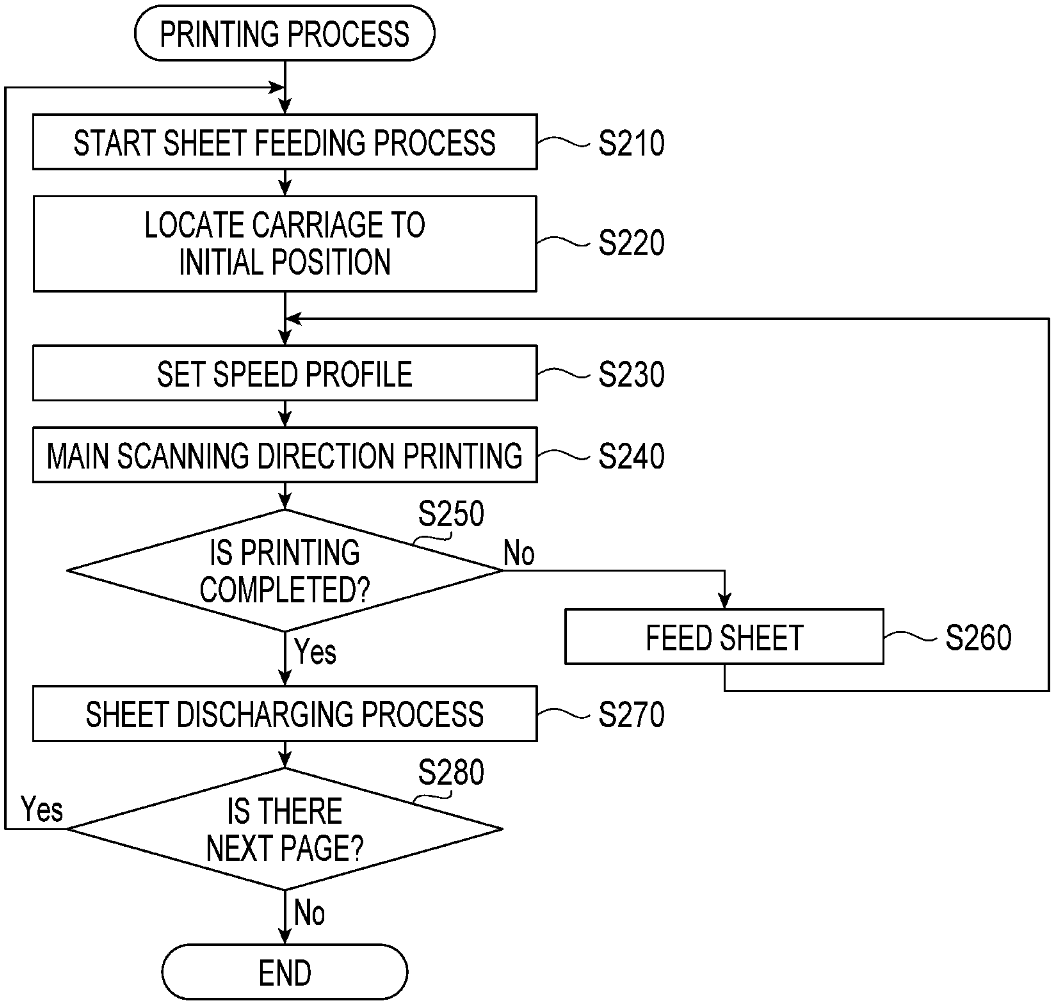
FIG. 5 is a flowchart illustrating a printing process performed by the processor.

When the processor 3 determines that there is an unprocessed job (S120: YES), the processor 3 executes the printing process shown in FIG. 5 as the print job (S130). By executing the printing job, an image corresponding to the print job is formed on the sheet P. The sheet P to which the printing process is performed (i.e., the sheet P on which the image is formed) is discharged on a discharge tray (not shown) of the image forming system 1.

When completing the printing process, the processor 3 executes the process of S140. In S140, the processor 3 determines whether a termination condition is satisfied. For example, the processor 3 determines that the termination condition is satisfied when the power is shut down or when the image forming system 1 enters the sleep mode.

When determining that the termination condition is not satisfied (S140: NO), the processor 3 returns the process to S120, and pauses until an unprocessed print job is generated (S120: YES) or the termination condition is satisfied (S140: YES). When it is determined that the termination condition is satisfied (S140: YES), the processor 3 terminates the main process shown in FIG. 4.

When starting the printing process in S130, the processor 3 starts a sheet feeding process (S210). In the sheet feeding process, the processor 3 causes the LF motor controller 33 to control the LF motor 21 so that one sheet P is separated from the sheets P accommodated in the sheet feed tray (not shown) and conveyed, in the auxiliary scanning direction, toward an ejection position at which the ink droplets ejected from the recording head 11 impact the sheet P. The processor 3 further move the carriage 12, which is located at a home position, to an initial position by causing the CR motor controller 32 to control the CR motor 13 (S220).

Thereafter, the processor 3 sets a speed profile defining the target speed Vr from a movement start position to a target stop position of the carriage 12 (S230). The target speed Vr from the movement start position to the target stop position corresponds to the target speed Vr at which the carriage 12 moves from one returning position to the next returning position.

The speed profile is set in consideration of an ink ejection section, in which the ejection operation of ejecting the ink droplets by the recording head 11 is performed, of the movement passage of the carriage 12 from the movement start position to the target stop position. The ink ejection section corresponds to a processing section in which the printing process is applied to the sheet by ejecting the ink droplets.

The entity of the speed profile may be data representing the target speed Vr at each point of time from the start of a movement to the stop of the movement, as the target speed Vr from the movement start position to the target stop position. According to another example, the entity of the speed profile may be data representing the target speed Vr at each point of movement from the starting point of movement to the target stop position.

In S230, to set the speed profile, a speed profile setting process shown in FIG. 6 and FIG. 7, described in detail below, is executed. After setting the speed profile, the processor 3 performs the printing in the main scanning direction (hereinafter, simply referred to as a "main scanning direction printing") (S240).

In S240, the processor 3 instructs the CR motor controller 32 to control the CR motor 13 according to the speed profile set in S230. Further, the processor 3 instructs the recording controller 31 to input image data representing an image to be formed on the sheet P in the recording controller 31, and control the ejection operation of the ink droplets by the recording head 11 based on the image data.

According to the instruction, the CR motor controller 32 controls the CR motor 13 such that the carriage 12 moves, from the movement start position to the next returning position, which corresponds to the target stop position, in accordance with the speed trajectory following the speed profile set as described above. The recording controller 31 controls the recording head 11 such that the ejection operation of the ink droplets to form the image corresponding to the image data is performed by the recording head 11 in conjunction with the movement of the carriage 12.

As the main scanning direction printing is performed in S240, an image for one pass based on the image data is formed on the sheet P. It is noted that the image for one pass is an image formed on the sheet P by the ejection operation of the ink droplets by the recording head 11 during the movement of the carriage, in the main scanning direction, from the returning position to the next returning position.

When the main scanning direction printing in S240 is completed, the processor 3 determines whether the printing process for one page of the sheet P has been completed (S250). When it is determined that the printing process for one page has not been completed (S250: NO), the processor 3 causes the LF motor controller 33 to control the LF motor 21 to convey the sheet P in the auxiliary scanning direction by a particular distance corresponding to a width, in the auxiliary scanning direction, of an image for one pass (S260).

After executing the process in S260, the processor 3 sets the speed profile to be used in the next main scanning direction printing (S230). After setting the speed profile, the processor 3 forms an image for one pass on the sheet P which has been fed, in the auxiliary scanning direction, by the particular distance in the process of S260 by executing the main scanning direction printing using the thus set speed profile (S240).

Until it is determined that the printing process for one page of the sheet P has been completed, the processor repeatedly executes the process in S230-S260. When it is determined that the printing for one page has been completed (S250: YES), the processor 3 executes a process in S270.

In S270, the processor 3 executes the sheet discharging process to discharge the sheet P to which the printing has been completed. In the sheet discharging process, the sheet P on which an image has been printed is discharged onto a sheet discharge tray (not shown) by causing the ASIC 2 to control the LF motor 21.

Further, the processor 3 determines whether the currently processed print job contains image data for the next page (S280). When it is determined that the image data contains the image data for the next page (S280: YES), the processor 3 returns the process to S210, and executes the page printing process of the next page (S210-S270). In this way, the processor 3 executes the page printing process regarding each page. When the page printing process for all the pages has been completed (S280: NO), the processor 3 terminates the printing process.

Next, a speed profile setting process which is executed in S230 by the processor 3 will be described.

Figure 6:
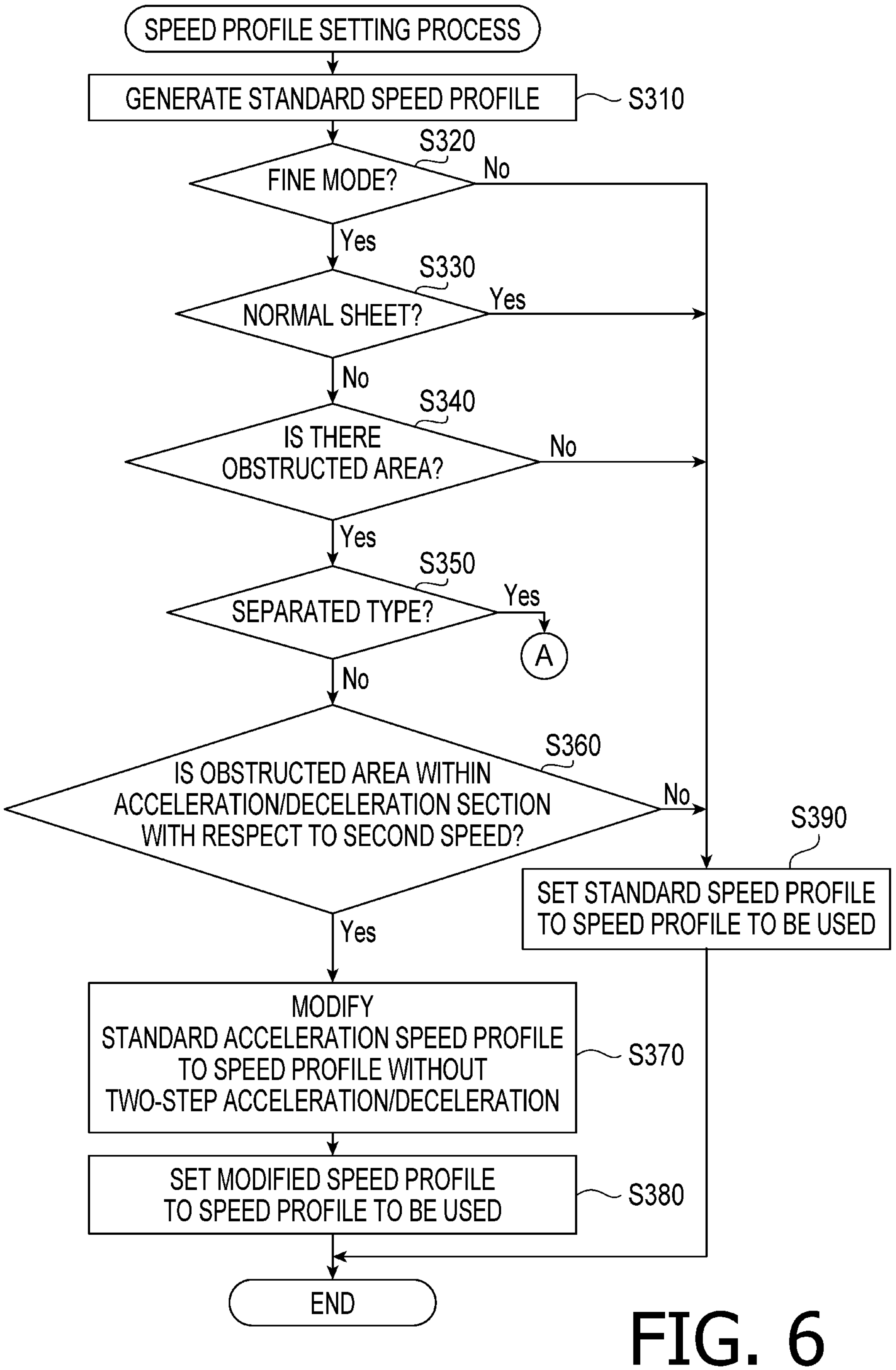
FIGS. 6 and 7 show a flowchart illustrating a speed profile setting process performed by the processor.
Figure 7:
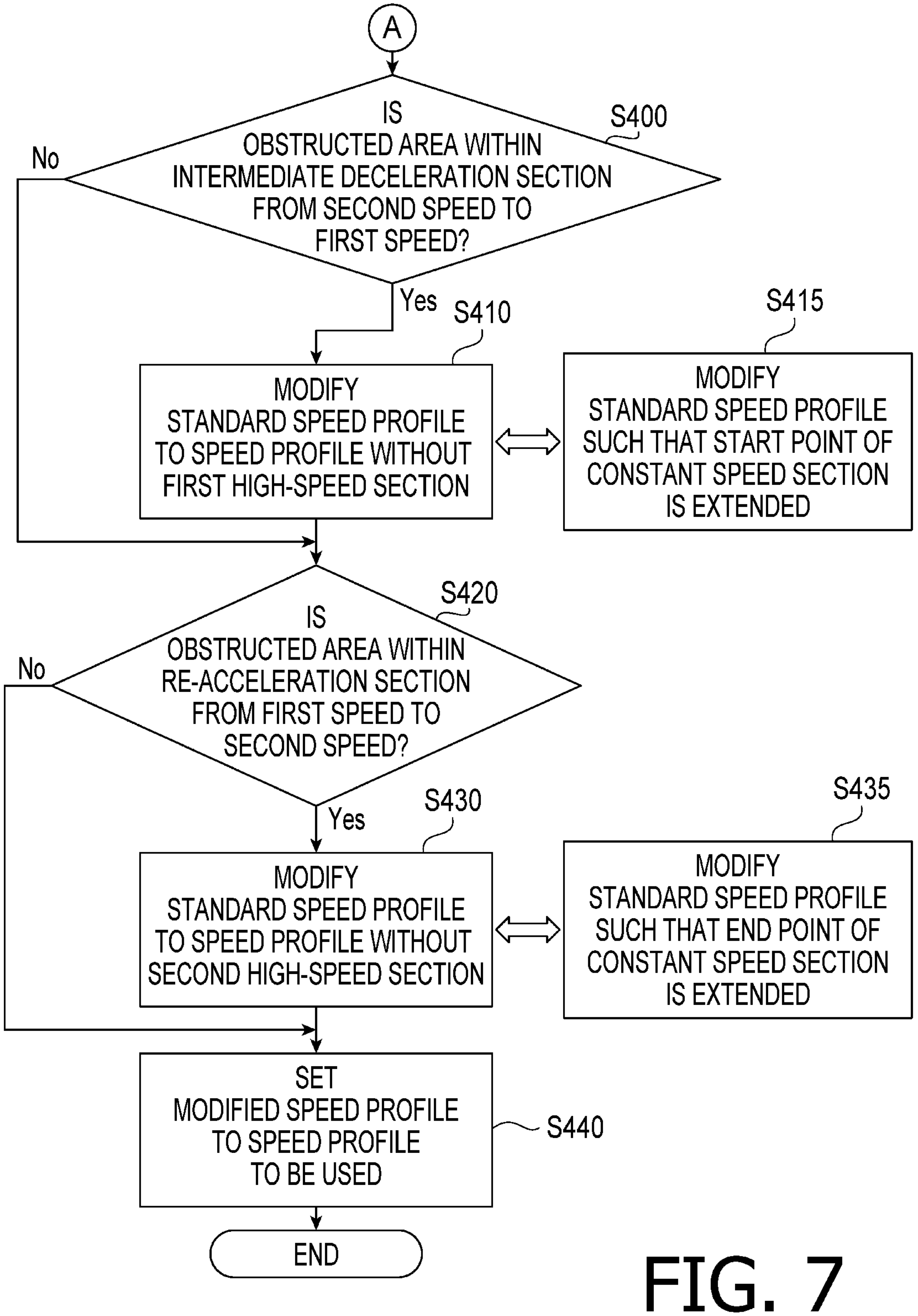

When the speed profile setting process shown in FIGS. 6 and 7 is started, the processor 3 generates a standard speed profile (S310).

The standard speed profile is a speed profile that defines the target speed of the carriage 12, in the next main scanning direction printing, when the carriage 12 is moved from the movement start position to the target stop position without considering the presence or absence of the obstructed area. It is noted that the standard speed profile is modified when there exists an obstructed area, as described below.

The standard speed profile is generated such that the carriage 12 moves at a first speed Vr1 (i.e., at the constant speed) in an ink ejection section in which the ejection operation of the ink droplets by the recording head 11 is performed. The carriage 12 moves at a high speed (i.e., at the second speed Vr2 faster than the first speed Vr1), to the extent possible, in a non-ink ejection section which is a section (or sections) other than the ink ejection section, in order to shorten the movement time of the carriage 12 from the movement start position to the target stop position.

The first speed Vr1 is set to a speed at which the ejection operation of the ink droplets can be performed appropriately. The standard speed profile is set, in consideration of the ink ejection section, so that the ejection operation of the ink droplets is executed when the carriage 12 is moving at the constant speed at the first speed Vr1.

Figure 8A:
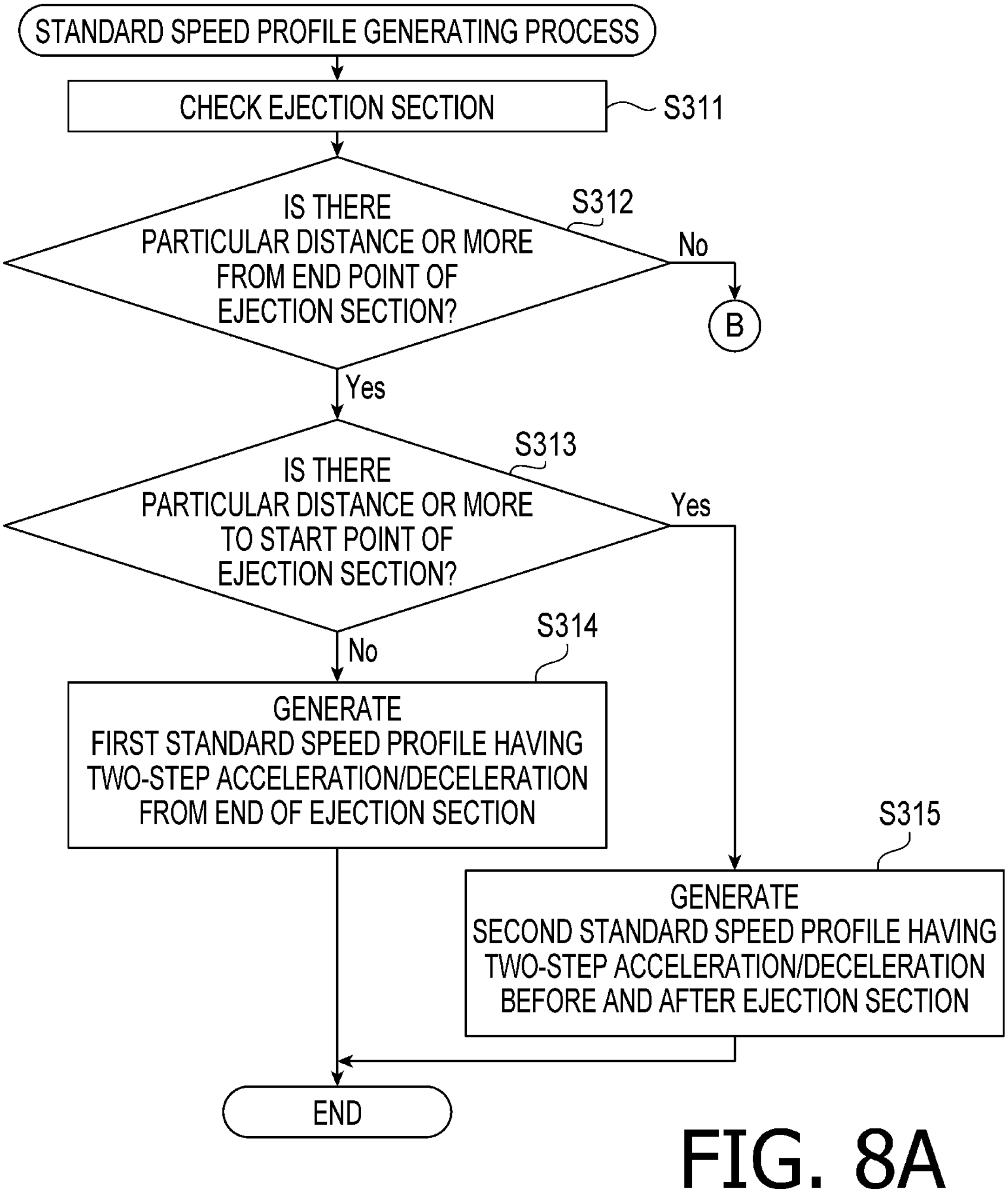
FIGS. 8A and 8B show a flowchart illustrating a standard speed profile generating process performed by the processor.
Figure 8B:
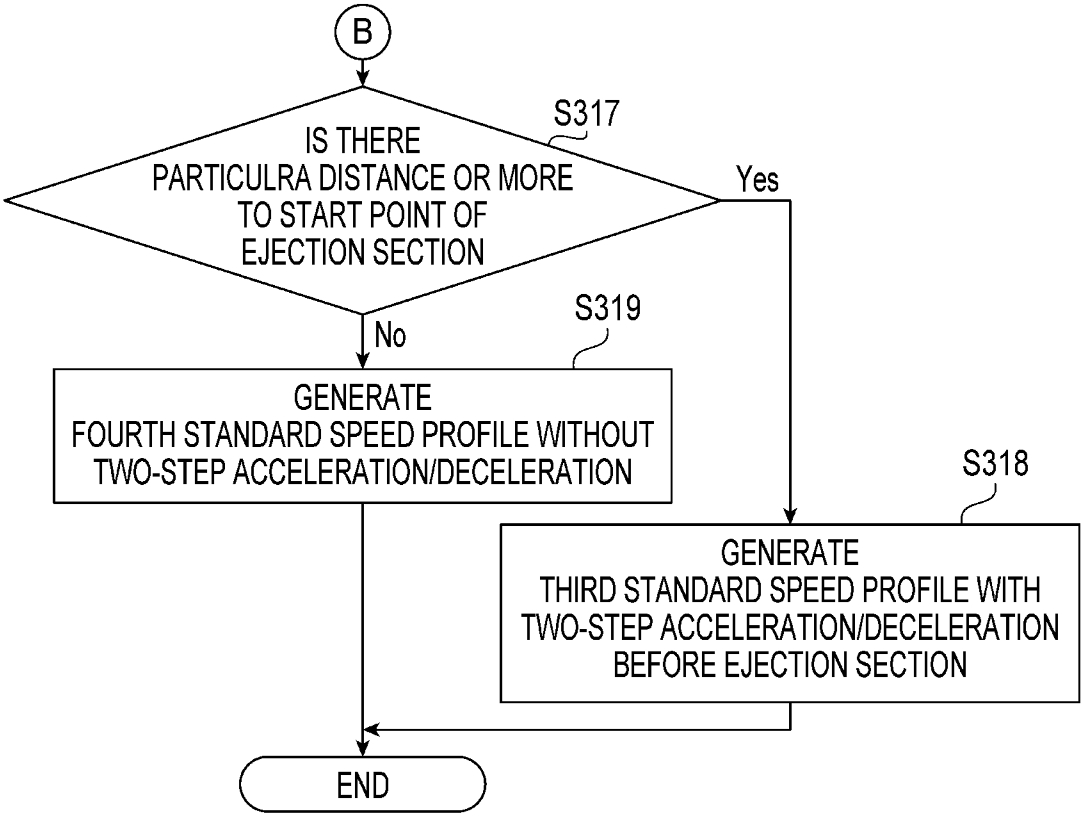

The processor 3 generates the standard speed profile by executing a standard speed profile generating process shown in FIGS. 8A and 8B (S310). When the standard speed profile generating process is started, the processor identifies the ink ejection section in which the ejection operation of the ink droplets by the recording head 11 is performed within the movement passage of the carriage 12 from the movement start position to the target stop position in the next main scanning direction printing (S311).

Further, the processor 3 determines whether or not a distance from an end point of the ink ejection section to the target stop position is equal to or greater than a particular distance necessary for a high-speed movement of the carriage 12 (S312). It is noted that the particular distance is a distance necessary to accelerate the moving speed of the carriage 12 to reach the speed for the high-speed movement. When it is determined that the distance from the end point of the ink ejection section to the target stop position is equal to or greater than the particular distance for the high-speed movement (S312: YES), the processor 3 determines whether or not a distance from the movement start position to a start point of the ink ejection section is equal to or greater than a particular distance necessary for the high-speed movement of the carriage 12 (S313).

Figure 9A:
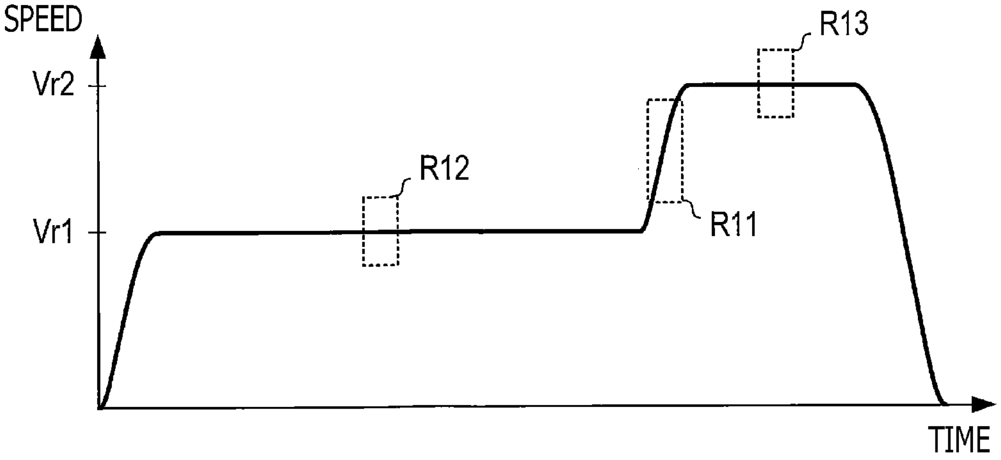
FIG. 9A shows a graph illustrating an example of a first standard speed profile.

When it is determined that the distance from the movement start position to the start point of the ink ejection section is less than the particular distance necessary for the high-speed movement (S313: NO), the processor 3 generates a first standard speed profile to realize a target acceleration/deceleration motion as shown in FIG. 9A as the standard speed profile (S314). Thereafter, the processor 3 terminates the standard speed profile generating process shown in FIGS. 8A and 8B.

The first standard speed profile is a speed profile with two-step acceleration/deceleration, which has the following features.

(a) The first standard speed profile includes an acceleration section and is configured such that, the carriage 12 located at the movement start position is accelerated to the first velocity Vr1 within the acceleration section. The end point of the acceleration section is before the start point of the ink ejection section.

(b) The first standard speed profile includes a constant speed section and is configured such that, after the acceleration of the carriage 12 to the first speed Vr1 is completed and until the carriage 12 reaches the end point of the ink ejection section, the carriage 12 is moved at the constant speed at the first speed Vr1 in the constant speed section.

(c) The first standard speed profile includes a re-acceleration section and is configured such that, immediately after the carriage 12 has passed the end point of the ink ejection section, the carriage 12 is accelerated to the second speed Vr2 within the re-acceleration section.

(d) The first standard speed profile includes a high-speed section and is configured such that the carriage 12 is moved at a constant speed at the second speed Vr2 from when the acceleration of the carriage 12 to the second speed Vr2 is completed and until the carriage 12 reaches a deceleration start position which is before the target stop position by a distance necessary for deceleration, and the carriage is moved at the constant speed at the second speed Vr2 within the high-speed section.

(e) The first standard speed profile includes a deceleration section and is configured such that, immediately after the carriage 12 has reached the deceleration start position, the carriage 12 is decelerated within the deceleration section and finally stopped at the target stop position.

As can be understood from the above-described features of the first standard speed profile, the two-step acceleration/deceleration means the acceleration/deceleration between the first speed Vr1 and the second speed Vr2.

Figure 9B:
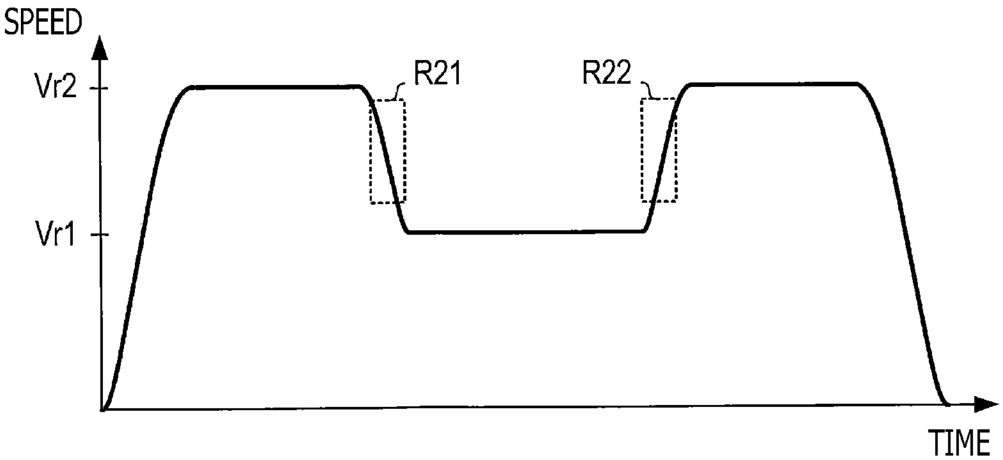
FIG. 9B shows a graph illustrating an example of a second standard speed profile.

On the other hand, when the processor 3 determines that a distance from the movement start position to the start point of the ink ejection section is equal to or greater than a particular distance required for the high-speed movement of the carriage (S313: YES), the processor 3 generates a second standard speed profile as shown in FIG. 9B as the standard speed profile (S315). Thereafter, the standard speed profile generating process shown in FIGS. 8A and 8B is terminated.

The second standard speed profile is a speed profile with two-step acceleration/deceleration, which has the following features.

(a) The second standard speed profile includes an acceleration section and is configured such that the carriage 12 located at the movement start position is accelerated to the second speed Vr2 within the acceleration section.

(b) The second standard speed profile includes a first high-speed section and is configured such that, after completion of the acceleration of the carriage 12 to the second seed Vr2 and before the carriage 12 reaches a first deceleration start position that is before the start point of the ink ejection section, the carriage 12 is moved at a constant speed at the second speed Vr2. The first deceleration start position is a position before the start point of the ink ejection section by a particular amount which is defined in advance such that the deceleration of the carriage 12 is started at the first deceleration start position, the carriage 12 can stably move at the first speed Vr1 at the start point of the ink ejection section.

(c) The second standard speed profile includes an intermediate deceleration section, and is configured such that the carriage 12 at the first deceleration start position is decelerated to the first speed Vr1 within the intermediate deceleration section.

(d) The second standard speed profile includes a constant speed section, and is configured such that, when the deceleration of the carriage 12 to the first speed Vr1 has been completed and before the carriage 12 reaches the end point of the ink ejection section, the carriage 12 is moved at the constant speed at the first speed Vr1 within the constant speed section.

(e) The second standard speed profile includes a re-acceleration section and is configured such that, immediately after the carriage 12 has passed the end point of the ink ejection section, the carriage 12 is accelerated to the second speed Vr2 within the re-acceleration section.

(f) The second standard speed profile includes a second high-speed section and is configured such that, from when the acceleration of the carriage 12 to the second speed Vr2 is completed and until the carriage 12 reaches a deceleration start position which is before the target stop position by a distance necessary for deceleration, and the carriage 12 is moved at the constant speed at the second speed Vr2 within the second high-speed section.

(g) The second standard speed profile includes a deceleration section and is configured such that, immediately after the carriage 12 has reached the deceleration start position, the carriage 12 is decelerated within the deceleration section and finally stopped at the target stop position.

When the processor 3 determines that a distance from the end point of the ink ejection section to the target stop position is less than the particular distance necessary for the high-speed movement of the carriage (S312: NO), the processor 3 executes a process in S317. In S317, similarly to a process in S313, the processor 3 determines whether or not the distance from the movement start position to the start point of the ink ejection section is equal to or greater than a distance necessary for the high-speed movement.

Figure 10A:
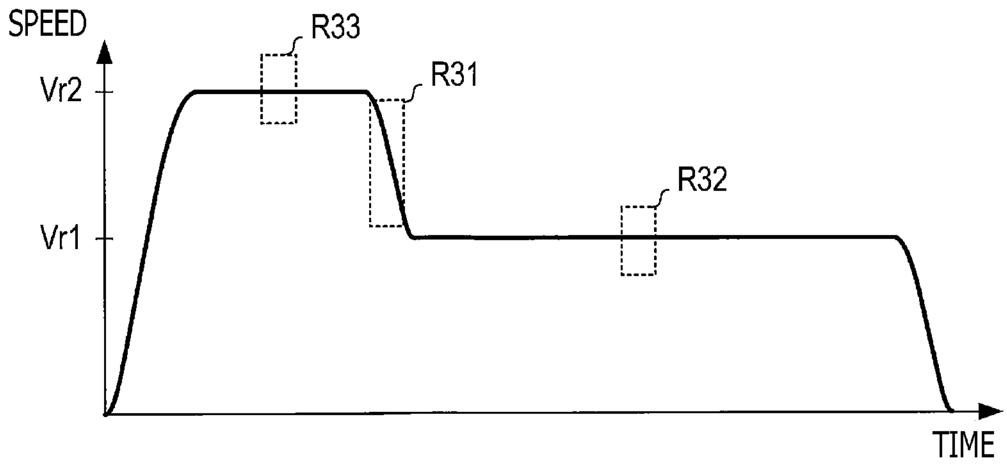
FIG. 10A shows a graph illustrating an example of a third standard speed profile.

When the processor 3 determines that the distance from the movement start position to the start point of the ink ejection section is equal to or greater than the distance necessary for the high-speed movement (S317: YES), the processor 3 generates a third standard speed profile to realize a target acceleration/deceleration motion as shown in FIG. 10A as the standard speed profile (S318). Then, the processor 3 terminates the standard speed profile generating process shown in FIGS. 8A and 8B.

The third standard speed profile is a speed profile with two-step acceleration/deceleration, which has the following features.

(a) The third standard speed profile includes an acceleration section and is configured such that the carriage 12 located at the movement start position is accelerated to the second velocity Vr2 within the acceleration section.

(b) The third standard speed profile includes a high-speed section and is configured such that, after completion of the acceleration of the carriage 12 to the second speed Vr2 and before the carriage 12 reaches the first deceleration start position which is before the start point of the ink ejection section, the carriage 12 is moved at a constant speed at the second speed Vr2 within the high-speed section. The first deceleration start point is a position defined before the start point of the ink ejection section by a particular amount so that deceleration of the carriage 12 moved at the second speed Vr2 is started when the carriage 12 reaches the first deceleration start position and the carriage 12 can be moved stably at the first speed Vr1 when the carriage 12 reaches the start point of the ink ejection section.

(c) The third standard speed profile includes an intermediate deceleration section and is configured such that the carriage 12 located at the first deceleration start position is decelerated to the first speed Vr1 within the intermediate deceleration section.

(d) The third standard speed profile includes a constant speed section and is configured such that, when the deceleration of the carriage 12 to the first speed Vr1 has been completed and before the carriage 12 reaches the deceleration start position which is before the target stop position by an amount necessary for decelerating the carriage 12, the carriage 12 is moved at the constant speed at the first speed Vr1 within the constant speed section.

(e) The third standard speed profile includes a deceleration section and is configured such that, immediately after the carriage 12 has reached the deceleration start position, the carriage 12 is decelerated within the deceleration section and finally stopped at the target stop position.

Figure 10B:
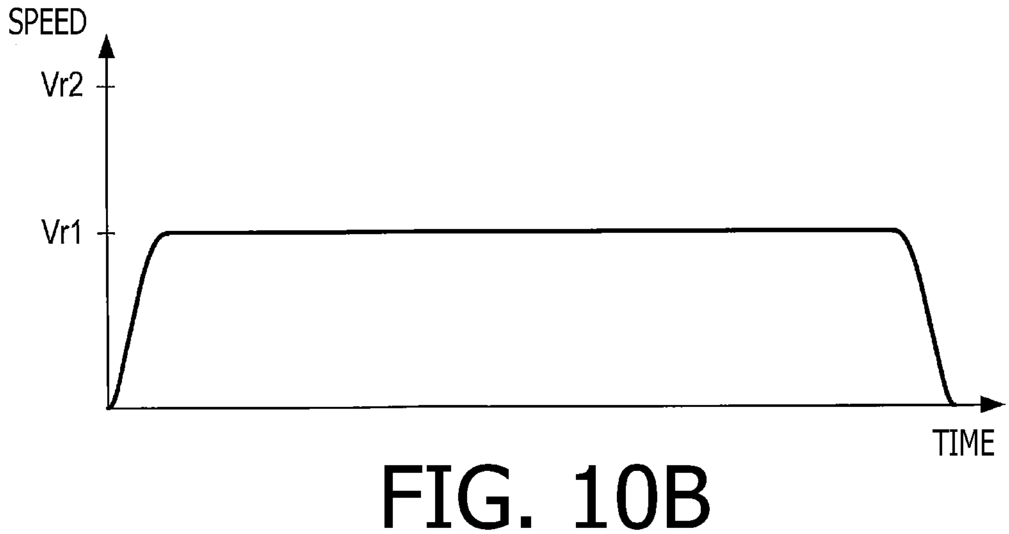
FIG. 10B shows a graph illustrating an example of a fourth standard speed profile.

When the processor 3 determines that the distance from the movement start position to the start point of the ink ejection section is less than the distance necessary for the high-speed movement (S317: NO), the processor 3 generates a fourth standard speed profile for realizing a target acceleration/deceleration motion as shown in FIG. 10B as the standard speed profile (S319). Then, the processor 3 terminates the standard speed profile generating process shown in FIG. 8.

The fourth standard speed profile is a speed profile without two-step acceleration/deceleration, which has the following features.

(a) The fourth standard speed profile includes an acceleration section and is configured such that, the carriage 12 located at the movement start position is accelerated to the first velocity Vr1 within the acceleration section. The end point of the acceleration section is before the start point of the ink ejection section.

(b) The fourth standard speed profile includes a constant speed section and is configured such that, after completion of the acceleration of the carriage 12 to the first speed Vr1 and before the carriage 12 reaches the deceleration start position, which is before the target stop position by a particular distance necessary for decelerating the carriage 12, the carriage 12 is moved at a constant speed at the first speed Vr1 within the constant speed section.

(c) The fourth standard speed profile includes a deceleration section and is configured such that, immediately after the carriage 12 has reached the deceleration start position, the carriage 12 is decelerated within the deceleration section and finally stopped at the target stop position.

When generating the standard speed profile in S310 (see FIG. 6), the processor determines whether a fine mode is set as the print mode of the currently executed print job (S320). The decision in S320 is made in order to change the speed profile based on the designation of a processing method by the user, in particular, based on an image quality designation. The print mode corresponds to an operation mode of the image forming system 1 regarding the printing.

The image forming system 1 according to the embodiment has a plurality of print modes corresponding to different print qualities, respectively. The image forming system 1 is configured to form an image corresponding to the sheet P in accordance with the print mode designated by the user who registered the print job (hereinafter, referred to as a "registration source") when the print job is registered. In each print mode, the carriage 12 is moved at a constant speed (i.e., the first speed Vr1) corresponding to the print quality in the ink ejection section.

In the ink ejection section, the carriage 12 is conveyed at the first speed Vr1 corresponding to the print mode, and the ink droplets are ejected in an ejection mode corresponding to the print mode, thereby an image having the corresponding image quality being formed on the sheet P. The standard speed profile is generated such that the carriage 12 moves at the constant speed at the first speed Vr1 corresponding to the print mode within the ink ejection section.

The plurality of print modes includes a normal mode in which an image is formed on the sheet P with a normal image quality, and the fine mode in which a high-definition image is formed on the sheet P. When it is determined that the print mode is set to the fine mode (S320: YES), the processor executes a process in S330.

When it is determined that the print mode is not set to the fine mode (S320: NO), in other words, when it is determined that a print mode corresponding to an image quality which lower than the high-definition image quality corresponding to the fine mode is designated, the processor 3 sets the standard speed profile generated in S310 as the speed profile to be used in the next main scanning direction printing (S390) regardless of whether the obstructed area is included or not. Thereafter, the processor 3 terminates the speed profile setting process.

When the print mode is not the fine mode by the normal mode, it is likely that the processing speed is more important than the image quality for the registration source of the print job to be processed. Therefore, when the print mode is the normal mode, the processor 3 sets the standard speed profile as the speed profile to be used without performing a correction operation of the speed profile prioritizing the image quality over the process speed.

In S330, the processor 3 determines whether the sheet P used in the print job is a specific type of sheet, concretely, whether the sheet P is a normal sheet. The determination here is made in order to change the speed profile in accordance with the type of the sheet P, in particular, a material of the sheet P. When the print job is registered, information regarding the sheet type is input by the registration source of the print job. The processor 3 is capable of determining the type of the sheet P to be used for the print job based on the information regarding the sheet type as input. Examples of the types of sheet P the processor 3 is capable of distinguishing include the normal sheet, an inkjet sheet, a glossy sheet and a glossy photo sheet.

When it is determined that the sheet P is of the normal type, the processor 3 sets the standard speed profile generated in S310 as the speed profile to be used in the next main scanning direction printing regardless of whether the obstructed area exists (S390). Thus, according to the present embodiment, when the normal sheet is used as the sheet P, the processing speed is prioritized. Thereafter, the processor 3 terminates the speed profile setting process.

When determining that the sheet P is not the normal sheet (S330: NO), the processor checks the presence or absence of the dirt 70 on the linear scale 46, that is, whether there exists the obstructed area on the linear scale 46 (S340). In this example, it is determined whether there exists, in the standard speed profile generated in S310, an obstructed area in an intermediate section between the acceleration section in which the carriage 12 located at the movement start position is accelerated and in a state where the carriage 12 moves at the constant speed, and the deceleration section in which the carriage 12 moved at the constant speed is decelerated so as to be stopped at the target stop position.

When the processor 3 determines that the obstructed area does not exist in the intermediate section (S340: NO), the processor sets the standard speed profile generated in S310 as the speed profile to be used in the next main scanning direction printing (S390). Thereafter, the processor 3 terminates the speed profile setting process.

When the processor 3 determines that the obstructed area exists in the intermediate section (S340: YES), the processor 3 determines whether the standard speed profile generated in S310 is the second standard speed profile which is a separated high-speed section type speed profile (S350).

When determining that the generated standard speed profile is the second standard speed profile (S350: YES), the processor 3 executes a process of S400 (see FIG. 7). When determining that the generated standard speed profile is not the second standard speed profile (S350: NO), the processor 3 executes a process of S360.

In S360, the processor 3 determines whether there exists an obstructed area in the acceleration/deceleration sections with respect to the second speed. The acceleration/deceleration sections with respect to the second speed correspond to the re-acceleration section in which the carriage 12 is accelerated from the first speed Vr1 to the second Vr2 and the intermediate deceleration section in which the carriage 12 is decelerated from the second speed Vr2 to the first speed Vr1.

In a case where the main scanning direction printing is performed based on the standard speed profile generated in S310 (S240), the moving speed of the carriage 12 would be controlled at the target speed corresponding to the re-accelerating section or the intermediate deceleration section with the carriage 12 being located in the obstructed area, the processor 3 makes an affirmative determination in S360.

When the standard speed profile generated in S310 is the first standard speed profile shown in FIG. 9A, and the obstructed area is in an area R11 shown in FIG. 9A, the processor 3 makes an affirmative decision in S360. On the other hand, when the obstructed area is in an area R12 within the constant speed section or in an area R13 within the high-speed section (see FIG. 9A), the processor 3 makes a negative decision in S360.

When the standard speed profile generated in S310 is the third standard speed profile shown in FIG. 10A and the obstructed area is in the area R31, the processor 3 makes an affirmative decision in S360. When the obstructed area is in an area R32 within the constant speed section or in an area R33 within the high-speed section shown in FIG. 10A, the processor 3 makes a negative decision in S360.

When it is determined that the obstructed area is in the acceleration/deceleration section with respect to the second speed Vr2 (S360: YES), the processor 3 modifies the standard speed profile so that the high-speed section is deleted from the standard speed profile as generated (S370). That is, the processor 3 modifies the standard speed profile generated as described above to the speed profile having the same shape as the fourth standard speed profile (see FIG. 10B) that does not have the two-step acceleration/deceleration. In other words, the speed profile is modified so that the carriage 12 is not moved at the high speed even in the non-ink ejection section.

Figure 11:
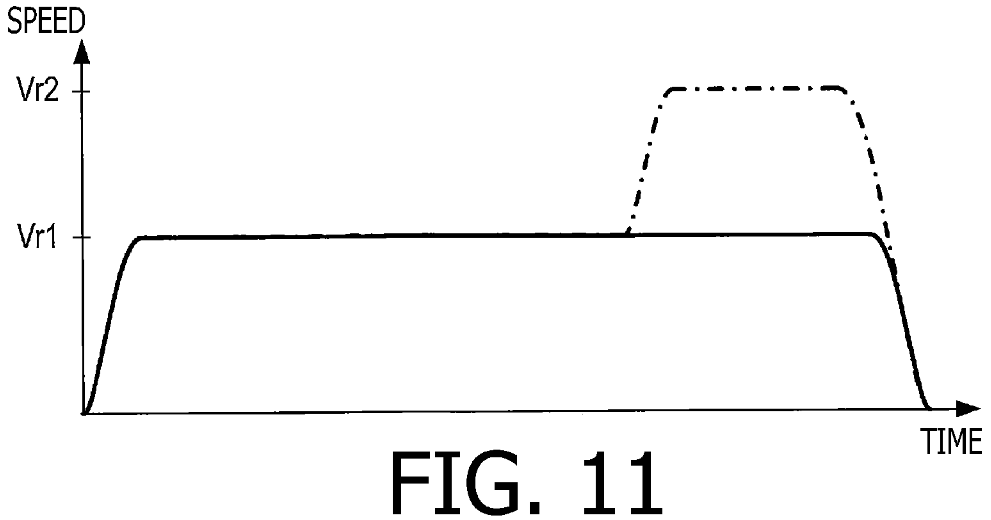
FIG. 11 shows a graph illustrating a speed profile which is a modification of the first standard speed profile.

When the standard speed profile generated in S310 is the first standard speed profiled shown in FIG. 9A, the standard speed profile is modified such that, as shown in FIG. 11, the re-acceleration section and the high-speed section after the carriage 12 has passed the ink ejection section (i.e., a portion indicated by single-dotted lines in FIG. 11) are removed so that the carriage 12 is moved at the first speed Vr1, after having passed through the ink ejection section, until the carriage 12 passes the deceleration start position which is before the target stop position, and then the deceleration of the carriage 12 is started at the deceleration start position to stop the carriage 12 at the target stop position.

Thereafter, the processor 3 sets the modified speed profile as the speed profile to be used for the next main scanning direction printing (S380). In this way, when the processor 3 determines that the obstructed area exists in the acceleration/deceleration sections with respect to the second speed Vr2, the processor 3 adopts a control method to move the carriage 12 without the two-step acceleration/deceleration in the next main scanning direction printing in order to suppress the effect of the control error of the carriage 12 caused by the measurement error in the obstructed area.

When the processor 3 determines that the obstructed area does not exist in the acceleration/deceleration sections with respect to the second speed (S360: NO), the processor 3 sets the standard speed profile generated in S310 as the speed profile to be used in the next scanning direction printing, regardless of the presence or absence of the obstructed area in the other sections (S390). Thereafter, the processor 3 terminates the speed profile setting process.

In S400 (see FIG. 7), the processor 3 determines whether there exists the obstructed area in the intermediate deceleration section, in which the speed of the carriage 12 is decelerated from the second speed Vr2 to the first speed Vr1. When it is determined that the obstructed area exists in an area R21 shown in FIG. 9B, the processor 3 makes an affirmative decision in S400.

When it is determined that the obstructed area exists in the intermediate deceleration section (S400: YES), the processor modifies the standard speed profile such that the first high-speed section is removed from the generated standard speed profile, and the non-ink ejection section before the ink ejection section is replaced with a constant speed section in which the carriage 12 is moved at the first speed Vr1 (S410).

Figure 12A:
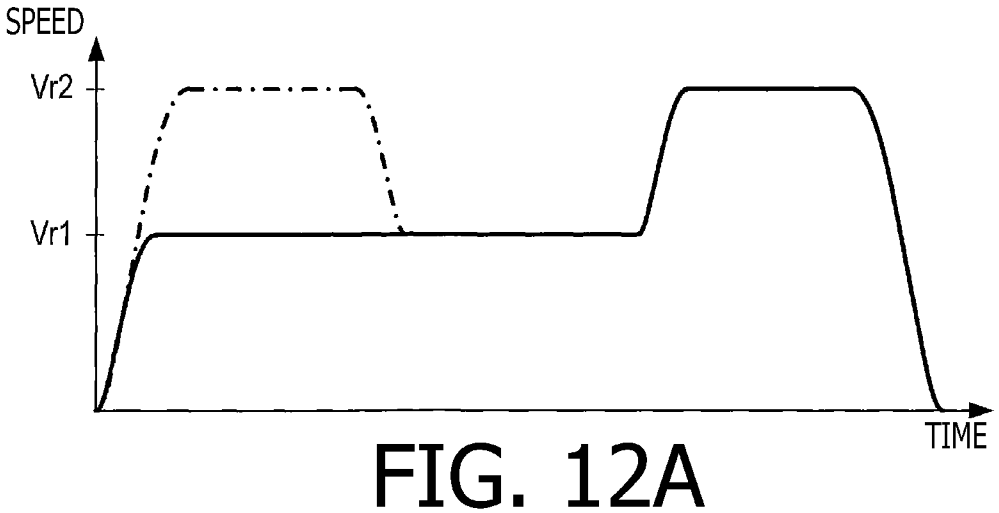
FIG. 12A shows a graph illustrating a speed profile which is a modification of the second standard speed profile.

In FIG. 12A, an example of the standard speed profile before the modification is shown by single-dotted lines, and an example of the speed profile after the modification by the process in S410 is shown by solid lines. In other words, the processor 3 modifies the standard speed profile generated as above to a speed profile of the same form as the first standard speed profile shown in FIG. 9A. After modifying the standard speed profile in S410, the processor 3 executes the process in S420.

When it is determined that the obstructed area does not exist in the intermediate deceleration section (S400: NO), the processor 3 executes a process of S420 without modifying the standard speed profile. In S420, the processor 3 determines whether there exists an obstructed area within the re-acceleration section in which the moving speed of the carriage 12 is to be accelerated from the first speed Vr1 to the second speed Vr2. When it is determined that the obstructed area exists within an area R22 as shown in FIG. 9B, the processor 3 makes an affirmative decision in S420.

When it is determined that the obstructed area does not exist in the re-acceleration section (S420: NO), the processor 3 executes a process in S440. When it is determined that the obstructed area exists in the re-acceleration section (S420: YES), the processor 3 executes the process in S440 after modifying the speed profile in S430.

In S430, the processor 3 modifies the standard speed profile so that the second high-speed section is deleted from the standard speed profile generated in S310 or the modified speed profile in S410, and the non-ink ejection section following the ink ejection section is replaced with the constant speed section in which the carriage 12 is moved at the constant speed at the first speed Vr1 (S430).

Figure 12B:
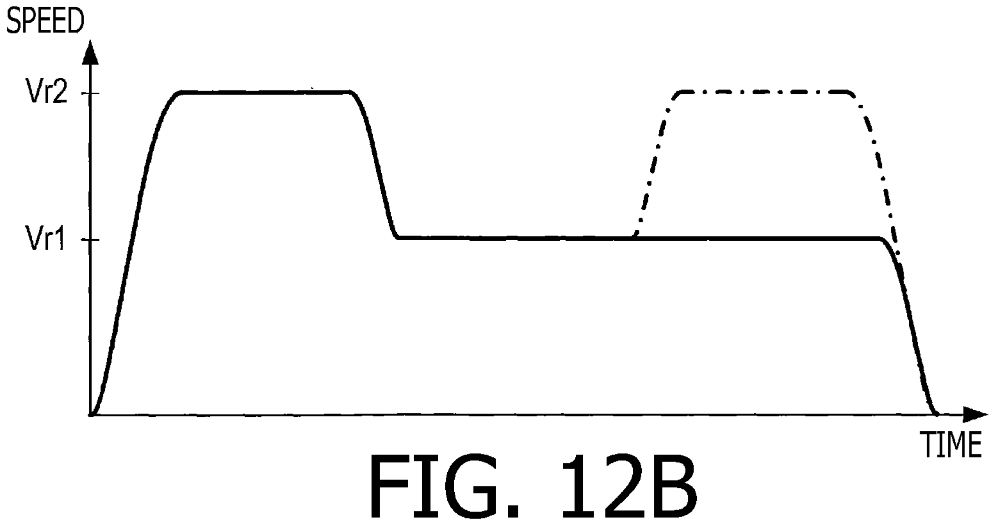
FIG. 12B shows a graph illustrating a speed profile which is another modification of the second standard speed profile.

In FIG. 12B, an example of the standard speed profile before modification is indicated by single-dotted lines, and an example of the modified speed profile modified in the process of S430 by solid lines. When both the modification in S410 and the modification in S430 are received, the standard speed profile is modified to a speed profile having the same form as the fourth standard speed profile which does not have the two-step acceleration/deceleration (see FIG. 10B).

When the standard speed profile has been modified by one or both of the processes of S410 and S430, the processor 3 sets the modified speed profile as the speed profile to be used in the next main scanning direction printing in S440. When the standard speed profile has not been modified, the standard speed profile generated in S310 is set as the speed profile to be used in the next main scanning direction printing, and the processor 3 terminates the speed profile setting process shown in FIG. 6 and FIG. 7.

Through the above-described speed profile setting process, a speed profile is set according to the presence or absence and position of the obstructed area in the intermediate section between the acceleration section from the movement start point to a position where the carriage 12 is transited to the constant speed state, and the deceleration section from a position where the carriage is in the constant speed state to the target stop position at which the carriage 12 is stopped. Then, the movement control of the carriage 12 based on the thus set speed profile is executed in the subsequent main scanning direction printing. When an obstructed area covers the acceleration/deceleration section with respect to the second speed, the corresponding two-step acceleration/deceleration is canceled, thereby the degradation of the movement control of the carriage 12 due to the existence of the obstructed area is suppressed.

Figure 13:
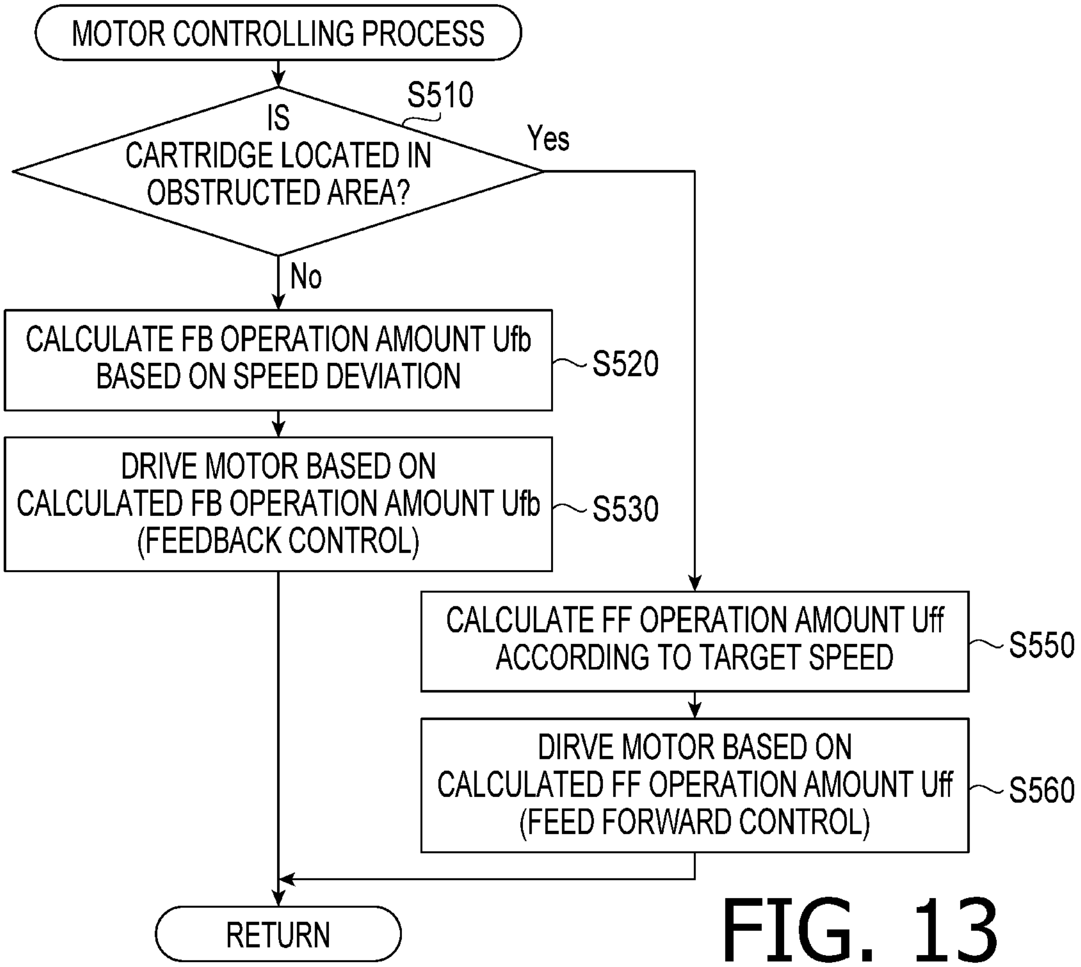
FIG. 13 is a flowchart illustrating a motor controlling process to be performed by a CR motor controller at every controlling period.

The details of the motor controlling process performed by the CR motor controller 32 to control the speed of the carriage 12 based on the speed profile will be described with reference to FIG. 13. The CR motor controller 32 receives an instruction from the processor 3 in S240 and executes a motor controlling process shown in FIG. 13 every particular control cycle until the carriage 12 is moved to the returning position according to the set speed profile.

In the motor controlling process for each control cycle, the CR motor controller 32 determines whether the carriage 12 is located in the obstructed area based on the measured position value X of the carriage 12 input from the linear encoder processor 34 (S510).

When it is determined that the carriage 12 is not located within the obstructed area (S510: NO), the CR motor controller 32 calculates a deviation E=Vr−V between the measured speed V of the carriage 12 input from the linear encoder processor 34 and the target speed Vr according to the speed profile, and calculates a feedback operation amount Ufb based on the deviation E (S520).

The CR motor controller 32 inputs the deviation E into a particular transfer function and calculates the feedback operation amount Ufb to reduce the deviation E. The CR motor controller 32 may calculate the feedback operation amount Ufb corresponding to the deviation E using a PID control method.

The CR motor controller 32 determines the feedback operation amount Ufb calculated above as an operation amount U of the CR motor 13. Thereafter, the CR motor controller 32 inputs a control signal to realize the operation amount U to the CR motor driver 19 (S530). In this way, the CR motor driver 19 drives the CR motor 13 with a driving power (e.g., a driving voltage or a driving current) corresponding to the determined operation amount U.

As above, when the carriage 12 is located outside the obstructed area, the CR motor controller 32 controls the speed of the carriage 12 by a feedback control based on the deviation E=Vr−V between the measured speed V and the target speed Vr.

On the other hand, when the CR motor controller 32 determines that the carriage 12 is located within the obstructed area (S510: YES), the processor 3 executes a process of S550. In S550, the CR motor controller 32 calculates a feed-forward operation amount Uff corresponding to the target speed Vr without using the measured speed V. For example, the feed-forward operation amount Uff is obtained by inputting the target speed Vr, which follows the speed profile, into a particular transfer function based on the equation of motion of the carriage 12.

When the carriage 12 is moving at a constant speed, the reaction force acting on the carriage 12 and CR motor 13 is basically the reaction force caused by viscous friction. The viscous friction is proportional to the speed of the carriage 12.

Therefore, the feed-forward operation amount Uff within the section in which the carriage 12 is moving at a constant speed can be set to the value K×Vr, which is the target speed Vr according to the speed profile multiplied by a coefficient K corresponding to the viscous friction.

The CR motor controller 32 determines the feed-forward operation amount Uff calculated in this way as the operation amount U of the CR motor 13. Thereafter, the CR motor controller 32 inputs a control signal to the CR motor driver 19 to realize the above-determined operation amount U (S560). This causes the CR motor driver 19 to drive the CR motor 13 with the drive power corresponding to the above-determined operation amount U.

In other words, the CR motor controller 32 performs the feed-forward control based on the speed profile in a case where the carriage 12 is located within the obstructed area, while the CR motor controller 32 performs the feedback control based on the speed profile in other cases.

As another example, the CR motor controller 32 may perform the feedback control based on the deviation E when the carriage 12 is located within the obstructed area as well as in a case where the carriage 12 is located outside the obstructed area. In this case, since the reliability of the measured speed V is low, by correcting the measured speed V used to calculate the deviation E, the feedback operation amount Ufb can be calculated from the deviation E=Vr−V* based on the corrected measured speed V*. The corrected measured speed V* can be, for example, a moving average of the measured speed V.

In the case where the obstructed area is in the acceleration section from the movement start point or in the deceleration section toward the target stop point, and in the case where the obstructed area is in the intermediate section between the acceleration and deceleration sections, the control in the obstructed area may be switched between the feedback control and the feed-forward control.

For example, the CR motor controller 32 may execute the feedback control based on the corrected measured speed value V* when the obstructed area is outside the intermediate section, while the CR motor controller 32 may execute the feed-forward control when the obstructed area is in the intermediate section.

According to the present embodiment, the obstructed area in the intermediate section is basically located in the constant speed section or high-speed section (including the first and second high-speed sections) where the carriage 12 is controlled to move at a constant speed by modifying the speed profile as described above. Therefore, whether the feedback control based on the corrected measured speed V* is executed or the feed-forward control is executed in the obstructed area, the stable speed control can be realized compared to the case where the acceleration control or the deceleration control is executed in the obstructed area.

Figure 14:
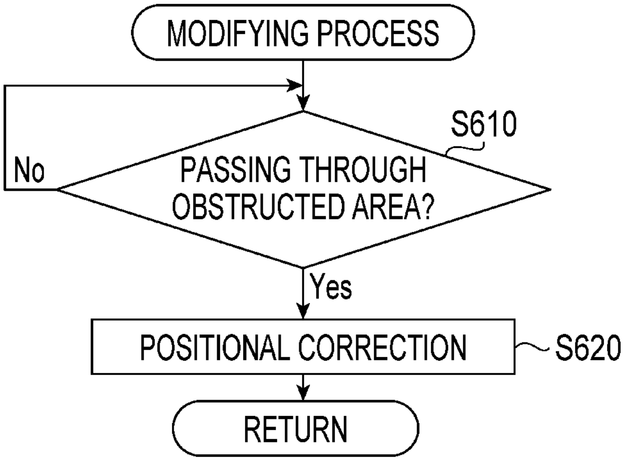
FIG. 14 is a flowchart illustrating a modifying process repeatedly performed by a linear encoder controller.

In addition, in order to suppress the influence of measurement errors due to the existence of the obstructed area, the linear encoder processor 34 can repeatedly perform a correction process shown in FIG. 14 separately from the process of calculating the measured values of the position and speed of the carriage 12 based on the encoder signals. The correction process is performed to remove errors contained in the measured position value X of the carriage 12, which is measured as the count value of the position counter when the carriage 12 passes through the obstructed area.

When the correction process is started, the linear encoder processor 34 pauses until the carriage 12 passes through the obstructed area (S610). It is noted that "passing through" here means the carriage 12 passes the end point of the obstructed area, which is an end point on a downstream side in the moving direction of the carriage 12.

Whether or not the carriage 12 has passed through the obstructed area can be determined based on the measured position value X of the carriage 12 when the carriage 12 enters the obstructed area, the width of the obstructed area, and a moving distance of the carriage 12 since the carriage entered the obstructed area. The moving distance can be calculated as a time integral of the target speed Vr, based on the target speed Vr of the carriage 12 and an elapsed time after the carriage 12 has entered the obstructed area.

When determining that the carriage 12 has passed through the obstructed area (S610: YES), the linear encoder corrects the error in the count value of the position counter that occurred in the obstructed area (S620).

Based on a moved distance D1 (in terms of count value) of the carriage 12 calculated as the time integral of the target speed Vr from the point of entry into the obstructed area, and a deviation D2 from the time of the entry of the count value of the position counter at the time when the carriage 12 has passed through the obstructed area, the linear encoder processor 34 is configured to calculate a difference (D1-D2) as an error in the count value caused by the dirt 70. The linear encoder processor 34 can correct the count value by adding the difference (D1-D2) so that the deviation D2 coincides with the moved distance D1.

According to another example, the linear encoder processor 34 may be configured to correct the error by determining the error in the count value of the position counter that occurs in the obstructed area during the pre-scanning and correcting the count value by the determined error, thereby the error being corrected.

According to the image forming system 1 described above, different types of speed profiles are set depending on the presence/absence and position of the obstructed area, and then, the speed control of the carriage 12 based on the speed profile with the two-step acceleration/deceleration as a first control method, or the speed control of the carriage 12 based on the speed profile without the two-step acceleration/deceleration as a second control method, is executed.

According to the first control method, the carriage 12 is controlled to move at a constant speed at the first speed Vr1 corresponding to the printing mode during the ink ejection section, and to move at least partially at a constant speed at the second speed Vr2 higher than the first speed Vr1 during the non-ink ejection section. According to the second control method, the carriage 12 is controlled to move at a constant speed at the first speed Vr1 in both the ink ejection and non-ink ejection sections.

According to this embodiment, the speed profile is modified such that, when the obstructed area is in the acceleration/deceleration section with respect to the second speed Vr2, which is a particular section, the corresponding two-step acceleration/deceleration is stopped, and the carriage 12 is controlled to pass through the obstructed area when controlled to move at the constant speed at the first speed Vr1.

The speed control of the carriage 12 when moving at the constant speed is stable compared to a case where the carriage 12 is accelerated/decelerated. When the carriage 12 is moved at the constant speed, even if the speed of the carriage 12 cannot be measured properly temporarily, the carriage 12 can be moved at the constant speed relatively stably by controlling the CR motor 13 based on a constant operation amount. For example, instead of performing feedback control based on the constant operation amount, the carriage may be moved by applying a constant current, for example, by assuming that there is no speed fluctuation in the constant speed section.

Therefore, by modifying the speed profile so that acceleration and deceleration with respect to the second speed Vr2 are not performed in the obstructed area, as in this embodiment, it is possible to suppress measurement errors in the obstructed area from having an undesirable effect on the control accuracy or control stability, and to appropriately move the carriage 12 at the high speed.

The conveyance of the carriage 12 considering such an obstructed area can improve the throughput of the printing process in the image forming system 1 while suppressing the effects of image quality degradation. In particular, according to the present embodiment, regardless of the location of the obstructed area, it is possible to move the carriage 12 at a higher speed compared to the case where the high-speed movement is stopped only because of the presence of the obstructed area. In the present embodiment, when the speed profile of the separated high-speed section type is modified due to the presence of the obstructed area, the method of partially stopping the high-speed movement is adopted, so that the carriage 12 can be moved at high speed efficiently. Therefore, according to the present embodiment, a highly convenient image forming system 1 can be provided to users.

MODIFICATION

Next, a modification of the image forming system 1 according to the present embodiment will be described. The image forming system 1 of the modified embodiment differs from the above-mentioned embodiment only in a part of the speed profile setting process that the processor 3 executes in S230. Therefore, in the following, configurations of the speed profile setting process executed by the processor 3 that differ from the above embodiment will be selectively explained, and the descriptions of other configurations that are identical to the above embodiment will be omitted.

Figure 15:
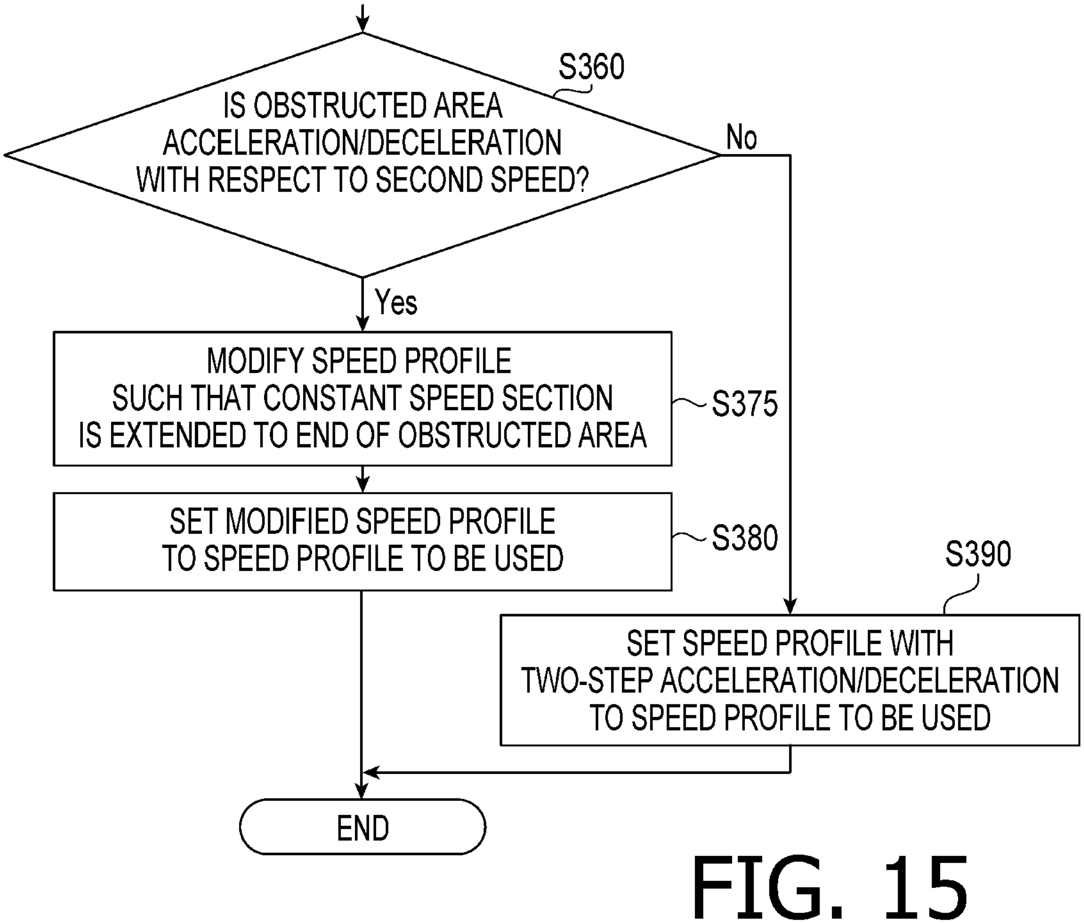
FIG. 15 is a flowchart illustrating a modified part of a speed profile setting process according to a modification.

According to one modification, when the processor 3 determines that there is an obstructed area in the acceleration/deceleration section with respect to the second speed (S360: YES) through the process of S310 to S350 shown in FIG. 6, the processor 3 according to the modification executes a process of S375 shown in FIG. 15 instead of the process of S370 shown in FIG. 6. In S375, the processor 3 modifies the standard speed profile so that the constant speed section in the standard speed profile generated in S310 is extended to the end point of the obstructed area, thereby the obstructed area being set to be included in the constant speed section.

Figure 16A:
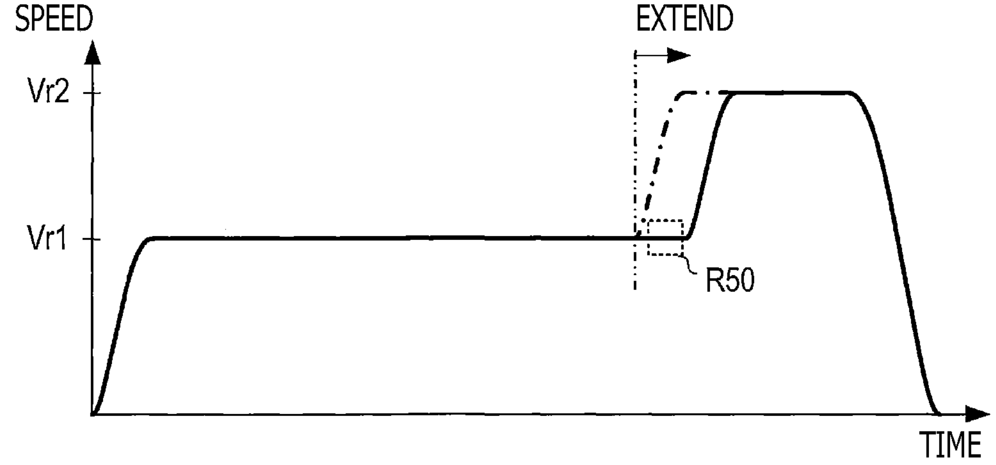
FIG. 16A shows a speed profile modified in accordance with an extension of a fixed speed section.

When the standard speed profile generated in S310 is the first standard speed profile shown in FIG. 9A, the processor 3 extends the constant speed section such that the start point of the re-acceleration section is delayed to a point just after the carriage 12 has passed an obstructed area R50 as shown in FIG. 16A.

As a result, the processor 3 modifies the standard speed profile such that the carriage 12 moves at a constant speed at the first speed Vr1 in the adjacent sections until the carriage 12 passes through the obstructed area. The single-dotted lines in FIG. 16*a* show the standard speed profile before modification, and the solid lines show the speed profile after modification by extending the constant speed section.

Figure 16B:
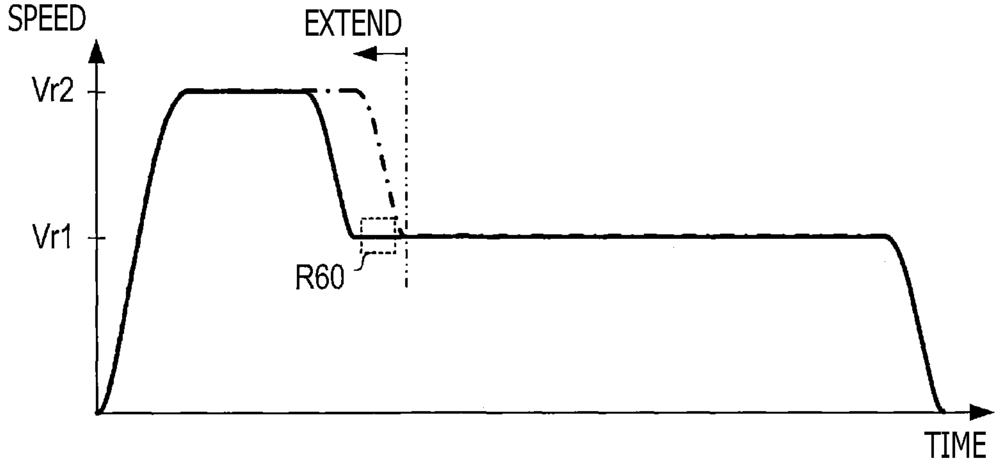
FIG. 16B shows another speed profile modified in accordance with an extension of a fixed speed section.

When the standard speed profile generated in S310 is the third standard speed profile shown in FIG. 10A, the processor 3 extends the constant speed section such that the starting point of the constant speed section is brought forward to a point before the carriage 12 enters an obstructed area R60, as shown in FIG. 16B.

As a result, the processor 3 modifies the standard speed profile such that the carriage 12 moves at a constant speed at the first speed Vr1 in the section containing the obstructed area of the non-ink ejection section adjacent to the ink ejection section to precede the same. The single-dotted lines shown in FIG. 16B also show the standard speed profile before modification to extend the constant speed section, similar to the single-dotted lines shown in FIG. 16A.

In S380, the processor 3 sets the speed profile modified in the process of S375 as the speed profile to be used in the next main scanning direction printing. Then, the processor 3 terminates the speed profile setting process (S230).

Figure 17A:
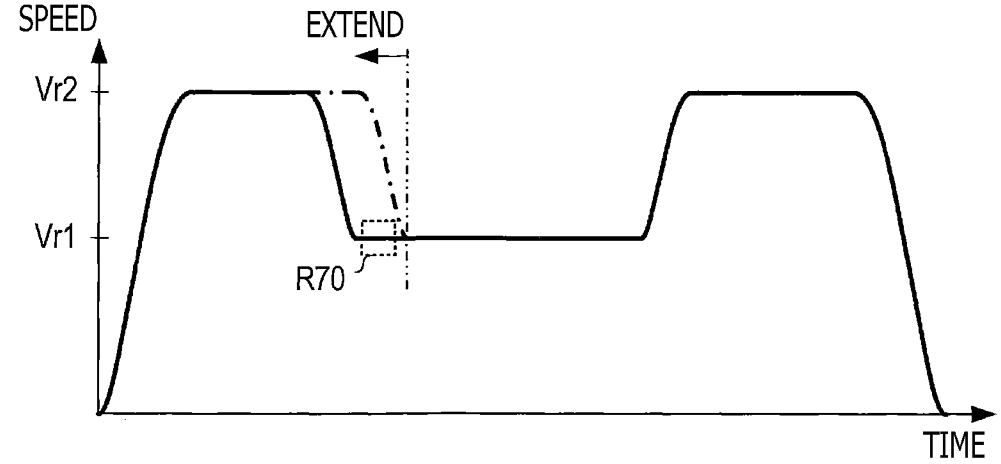
FIG. 17A shows still another speed profile modified in accordance with an extension of a fixed speed section.

When the processor 3 determines that the standard speed profile generated in S310 is the second standard speed profile, the processor 3 executes the process of S415 (see FIG. 7) instead of the process of S410, thereby bringing the starting point of the constant speed section earlier to the point before the carriage 12 enters an obstructed area R70, as shown in FIG. 17A. This causes the processor 3 to modify the standard speed profile to extend the constant speed section at least to the beginning of the obstructed area (S415).

Figure 17B:
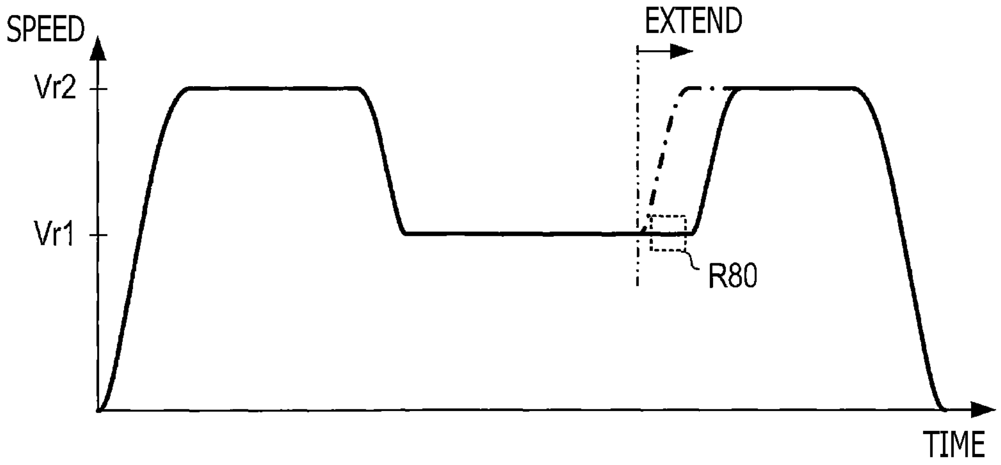
FIG. 17B shows another speed profile modified in accordance with an extension of a fixed speed section.

Similarly, by executing a process of S435 (see FIG. 7) instead of the process of S430, the processor 3 delays the start of the re-acceleration section to a point just after the carriage 12 has passed an obstructed area R80, as shown in FIG. 17B. As a result, the processor 3 modifies the standard speed profile to extend the constant speed section at least to the end of the obstructed area (S435).

The processor 3 sets the speed profile modified in S415 or S435 to the speed profile to be used in the next main scanning direction printing in S440 (see FIG. 7). In this way, according to the modification, when an obstructed area exists in the acceleration/deceleration area with respect to the second speed in the standard speed profile generated in S310, instead of stopping the two-step acceleration/deceleration, the start and/or end points of the constant speed section are extended to include the obstructed area.

Therefore, in the modified example, the carriage 12 can be moved at a high speed to improve the throughput of the printing process while suppressing the undesirable effects of the two-step acceleration/deceleration being executed in the obstructed area.

Although the exemplary embodiment and modification according to aspects of the present disclosures have been described above, the present disclosures are not necessarily limited to the above-mentioned configurations and may further take various forms. For example, if there exists an obstructed area, the processor 3 may operate to set the CR motor controller to a speed profile without two-step acceleration/deceleration, independent of the position of the obstructed area.

The processor 3 may operate to set the speed profile without the two-step acceleration/deceleration to the CR motor controller 32 by setting the standard speed profile generated in S310 to the speed profile to be used in the next main scanning direction printing when the processor 3 makes a negative decision in S340, while by executing the process of S370 without executing the process of S350 or S360 when the processor 3 makes an affirmative decision in S340.

In S340, the processor 3 may operate to affirmatively determine that an obstructed area exists when the target speed Vr in the standard speed profile is set to a speed exceeding the first speed Vr1.

In S340, the processor 3 may treat, within the acceleration section from the movement start position and to the target stop position, a non-constant speed section in a high-speed range to which the target speed Vr exceeding the first speed Vr1 is set as the same as the intermediate section described above, and determines presence or absence of the obstructed area in the non-constant speed section.

When the obstructed area is present in the non-constant speed section of this high-speed range, the processor 3 may make an affirmative decision in S360 and modify the speed profile such that the corresponding high-speed section is deleted and the obstructed area is replaced with a constant speed section in which the carriage 12 is moved at a constant speed at the first speed Vr1 (S370). In other words, the non-constant speed section in the high-speed range in which the moving speed of the carriage 12 exceeds the first speed Vr1 may be treated in the same way as the intermediate deceleration and re-acceleration sections described above, and the standard speed profile may be modified.

The technology according to the present disclosures can be applied not only to the image forming system 1 configured to form images on a sheet P, but also to various systems in which the motion of a processing head that performs a particular processing on an object is realized by motor control using an encoder.

The technology of the present disclosures is not limited to inkjet printers, but can be applied to other serial printers and garment printers. The technology according to the present disclosures can also be applied to machine tools, such as machines for printing wiring patterns. The technology according to the present disclosures is not necessarily limited to systems that process objects, but can be applied to various systems configured to transport moving objects by motor control using an encoder.

As an encoder for measuring position and speed, an encoder other than the transmissive linear encoder 14 described above may be used. For example, a reflective linear encoder that reads the encoder scale by emitting light from a light emitter and receiving light reflected by the encoder scale may be used.

When an encoder is configured such that the optical sensor reads the encoder scale obliquely, such as a reflective linear encoder, is used, the "obstructed area" can be a range of movement of the optical sensor when the optical sensor moves over an area that is offset from the front by a distance corresponding to the reading angle, rather than in front of the area with dirt on the encoder scale.

The technology according to the present disclosures can be applied to control systems that use rotary encoders. As an encoder, an encoder in which the sensor moves relative to the encoder scale by moving the sensor against a fixed encoder scale, and an encoder in which the sensor moves relative to the encoder scale by moving the encoder scale against a fixed sensor are known. To any of the control systems using such encoders, the technology according to the present disclosures can be applied.

The functions possessed by one component in the above embodiment may be distributed among multiple components. The functions possessed by the plurality of components may be integrated into a single component. For example, the controller does not have to be constituted by the processor 3 and the ASIC 2, but may be constituted by one or more processors without an ASIC, or may be constituted by one or more ASICs without a processor, or a combination of one or more processors and one or more ASICs. The one or more components of the controller, including at least one of the processor and the ASIC, may cooperate with each other to perform processing pertaining to the controller of the present disclosures.

In addition, some of the configurations of the embodiment may be omitted. Any form included in the technical concept identified from the wording of the claims should be regarded as an embodiment of the present disclosure.

What is claimed is:

1. A control system, comprising:

a motor;

a moving body configured to be driven by the motor to move along a passage and to process an object;

an encoder including an encoder scale and a sensor configured to move relative to the encoder scale in association with the moving body to output an encoder signal by reading the encoder scale;

a measuring instrument configured to measure a status amount representing a moving status of the moving body along the passage based on the encoder signal; and a controller configured to:

control movement of the moving body by controlling the motor based on the status amount measured by the measuring instrument and a speed profile defining a target speed of the moving body within a moving path from a movement start position to a stop position, the speed profile being a standard profile or a modified standard profile, set the standard profile, the standard profile including a first acceleration section, at least one non-processing section, a processing section and a first deceleration section, the moving body located at the movement start position being accelerated to a first speed in the first acceleration section, the moving body moving at the first speed being decelerated and stopped at the stop position in the first deceleration section, the moving body processing the object when moving in the processing section, determine whether or not the at least one non-processing section of the standard profile has a second acceleration section and a second deceleration section, a speed being accelerated from the first speed to a speed higher in the second acceleration section, a speed being decelerated from the speed higher to the first speed in the second deceleration section, in response to determining that the at least one non-processing section of the standard profile has the second acceleration section and the second deceleration section, determine presence or absence of an obstruction which prevents the sensor from normally reading the encoder scale at a portion of the encoder scale corresponding to at least one of the second acceleration section or the second deceleration section in the at least one non-processing section;

in response to determining the presence of the obstruction, selectively modify the standard profile to form the modified standard profile such that the moving body moves at the first speed at the portion corresponding to the obstruction, the modified standard profile being used as the speed profile.

2. The control system according to claim 1, wherein, the at least one non-processing section has at least one of a first non-processing section or a second non-processing section, the first non-processing section being a section between the first acceleration section and the processing section, the second non-processing section being a section between the processing section and the first deceleration section.

3. The control system according to claim 1, further comprising a user interface configured to receive a setting of a first operation mode and a second operation mode from a user, wherein the controller is operable in:

the first operation mode in which the controller modifies the set standard profile based on the determined presence or absence of the obstruction, and control the movement of the moving body in accordance with the modified standard profile; and the second operation mode in which the controller controls the movement of the moving body in accordance with the set standard profile even when an obstruction is detected.

4. The control system according to claim 3, wherein the moving body mounts an ink ejection head configured to eject ink droplets, the moving body being configured to perform, as a processing operation to process the object, an operation to form an image on the object by ejecting the ink droplets from the ink ejection head, and wherein the controller is configured to control the movement of the moving body in accordance with:

the first operation mode when a first image quality is instructed, as the setting, by the user; and the second operation mode when a second image quality which is lower than the first image quality is instructed, as the setting, by the user, and wherein the controller controls the movement of the moving body and the ejection of the ink droplets such that the image is formed on the object with the instructed image quality by controlling the ejection of the ink droplets by the ink ejection head in the processing section.

5. The control system according to claim 1, wherein the controller is operable in:

a first operation mode in which the controller modifies the set standard profile based on the determined presence or absence of the obstruction, and control the movement of the moving body in accordance with the modified standard profile; and a second operation mode in which the controller controls the movement of the moving body in accordance with the set standard profile even when an obstruction is detected, and wherein the controller is configured to control the movement of the moving body in one of the first operation mode or the second operation mode in accordance with one of material or a processing method of the object as the setting.

6. The control system according to claim 1, wherein the measuring instrument is configured to measure, as the status amount, at least a speed of the moving body, wherein the controller is configured to:

perform a feedback control of the speed of the moving body based on a deviation between a speed of the moving body measured by the measuring instrument and a target speed according to the standard profile or the modified standard profile after starting the control of the movement of the moving body.

7. The control system according to claim 6, wherein the controller is configured to execute a feedback control of the speed of the moving body by driving the motor by an operation amount in accordance with the deviation outside an area coinciding with the obstruction, and wherein the controller is configured to control the speed of the moving body by driving the motor by a particular drive amount corresponding to the target speed in the area coinciding with the obstruction without depending on the deviation.

8. The control system of claim 1, wherein the standard profile comprises a first standard profile, a second standard profile and a third standard profile, wherein in the first standard profile, a first non-processing section includes the second acceleration section and the second deceleration section, in the second standard profile, a second non-processing section includes the second acceleration section and the second deceleration section, and in the third standard profile, both the first non-processing section and the second non-processing section include the second acceleration section and the second deceleration section.

9. The control system of claim 8, wherein the setting of the standard profile is based on the location of the processing section with respect to at least one of the movement start position and the stop position.

10. The control system of claim 1, wherein the modifying of the standard profile comprises deleting the second acceleration section and the section deceleration section and setting the first speed as the target speed in the first non-processing section and/or the second non-processing section.

* * * * *